(12) United States Patent
Huang et al.

(10) Patent No.: US 11,102,476 B2
(45) Date of Patent: Aug. 24, 2021

(54) SUBBLOCK BASED AFFINE MOTION MODEL

(71) Applicant: QUALCOMM Incorporated, San Diego, CA (US)

(72) Inventors: Han Huang, San Diego, CA (US); Wei-Jung Chien, San Diego, CA (US); Vadim Seregin, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/723,318

(22) Filed: Dec. 20, 2019

(65) Prior Publication Data

US 2020/0213585 A1 Jul. 2, 2020

Related U.S. Application Data

(60) Provisional application No. 62/786,117, filed on Dec. 28, 2018.

(51) Int. Cl.
*H04N 19/105* (2014.01)
*H04N 19/149* (2014.01)
*G06F 1/03* (2006.01)
*G06F 17/16* (2006.01)
*H04N 19/176* (2014.01)

(52) U.S. Cl.
CPC ............ *H04N 19/105* (2014.11); *G06F 1/03* (2013.01); *G06F 17/16* (2013.01); *H04N 19/149* (2014.11); *H04N 19/176* (2014.11)

(58) Field of Classification Search
CPC .. H04N 19/105; H04N 19/149; H04N 19/119; H04N 19/59
See application file for complete search history.

(56) References Cited

U.S. PATENT DOCUMENTS

| | | | |
|---|---|---|---|
| 9,438,910 B1* | 9/2016 | Han | H04N 19/615 |
| 10,448,010 B2* | 10/2019 | Chen | H04N 19/176 |
| 10,798,403 B2* | 10/2020 | Ikai | H04N 19/52 |
| 2013/0251028 A1* | 9/2013 | Au | H04N 19/89 |
| | | | 375/240.02 |
| 2016/0119639 A1* | 4/2016 | Sato | H04N 19/103 |
| | | | 382/238 |

(Continued)

OTHER PUBLICATIONS

Affine transform prediction for next generation of video coding; 2015. (Year: 2015).*

(Continued)

*Primary Examiner* — Luis Perez-Fuentes
(74) *Attorney, Agent, or Firm* — Shumaker & Sieffert, P.A.

(57) ABSTRACT

A device for processing video data includes a memory configured to store video data and one or more processors implemented in circuitry. The one or more processors are configured to select two or more subblocks of one or more blocks of video data and generate an affine motion model for a current block of video data using a subblock motion vector from each of the two or more subblocks as control-point motion vectors for the current block. The one or more processors are further configured to determine one or more prediction blocks based on the affine motion model and predict the current block with the one or more prediction blocks.

18 Claims, 16 Drawing Sheets

(56) References Cited

U.S. PATENT DOCUMENTS

| | | | |
|---|---|---|---|
| 2017/0214932 A1* | 7/2017 | Huang | H04N 19/52 |
| 2017/0332095 A1* | 11/2017 | Zou | H04N 19/567 |
| 2018/0192069 A1* | 7/2018 | Chen | H04N 19/51 |
| 2018/0249177 A1* | 8/2018 | Lin | H04N 19/172 |
| 2018/0270500 A1* | 9/2018 | Li | H04N 19/54 |
| 2018/0316929 A1* | 11/2018 | Li | H04N 19/533 |
| 2019/0230361 A1* | 7/2019 | Zhang | H04N 19/176 |
| 2019/0281294 A1* | 9/2019 | Kim | H04N 19/182 |
| 2020/0029089 A1* | 1/2020 | Xu | H04N 19/61 |
| 2020/0077113 A1* | 3/2020 | Huang | H04N 19/54 |
| 2020/0084452 A1* | 3/2020 | Liao | H04N 19/176 |
| 2020/0112725 A1* | 4/2020 | Huang | H04N 19/122 |
| 2020/0137398 A1* | 4/2020 | Zhao | H04N 19/105 |
| 2020/0169748 A1* | 5/2020 | Chen | H04N 19/577 |
| 2020/0177877 A1* | 6/2020 | Chen | H04N 19/105 |
| 2020/0213585 A1* | 7/2020 | Huang | G06F 1/03 |
| 2020/0260108 A1* | 8/2020 | Chen | H04N 19/59 |
| 2020/0359039 A1* | 11/2020 | Zhao | H04N 19/503 |
| 2020/0359049 A1* | 11/2020 | Zhao | H04N 19/176 |
| 2021/0006787 A1* | 1/2021 | Zhang | H04N 19/119 |

OTHER PUBLICATIONS

Improved affine motion prediction; Oct. 2016. (Year: 2016).*
An efficient four-parameter affine motion model for video coding; 2017. (Year: 2017).*
Affine transform prediction for next generation of video coding; HTC—2015. (Year: 2015).*
Improved affine motion prediction, Zou; et al—2016. (Year: 2016).*
An efficient four-parameter affine motion model for video coding; Li; et al—2017. (Year: 2017).*
Bross B., et al., "Versatile Video Coding (Draft 1)", JVET-J1001-v2, Joint Video Experts Team (JVET) of ITU-T SG 16 WP 3 and ISO/IEC JTC 1/SC 29/WG 11, 10th Meeting, Apr. 2018, JVET-J1001-d2, 43 pages.
Bross B., et al., "Versatile Video Coding (Draft 7)", Joint Video Experts Team (JVET) of ITU-T SG 16 WP 3 and ISO/IEC JTC 1/SC 29/WG 11, JVET-P2001-v9, 16th Meeting: Geneva, CH, Oct. 1-11, 2019, 490 pages.
Chen J., et al., "Algorithm description for Versatile Video Coding and Test Model 1 (VTM 1)", Joint Video Exploration Team (JVET) of ITU-T SG 16 WP 3 and ISO/IEC JTC 1/SC 29/WG 11, 10th Meeting: San Diego, US, Apr. 10-20, 2018, Jun. 16, 2018, JVET-J1002-v2, 10 pages, XP030198635, http://phenix.int-evry.fr/jvet/doc_end_user/documents/10_SanDiego/wg11/JVET-J1002-v2.zip.
Chen J., et al., "Algorithm Description of Joint Exploration Test Model 1," 1, JVET Meeting; Oct. 19, 2015-Oct. 21, 2015; Geneva;(The Joint Video Exploration Team of ISO/IEC JTC1/SC29/WG11 and ITU-T SG.16 ); URL: http://phenix.int-evry.fr/jvet/,, No. JVET-A1001 Feb. 24, 2016 (Feb. 24, 2016), XP030150000, 27 pages.
Cheung H-K., et al., "Local Affine Motion Prediction for H.264 Without Extra Overhead", IEEE International Symposium on Circuits and Systems, ISCAS 2010—May, 30-Jun. 2, 2010—Paris, France, IEEE, US, May 30, 2010 (May 30, 2010), pp. 1555-1558, XP031724641, ISBN: 978-1-4244-5308-5, figure 1.
Ergen S., "ZigBee/IEEE 802.15.4 Summary", Sep. 10, 2004, 37 Pages.
Huang H., et al., "Affine Skip and Direct Modes for Efficient Video Coding", Visual Communications and Image Processing (VCIP), 2012 IEEE, IEEE, Nov. 27, 2012 (Nov. 27, 2012), pp. 1-6, XP032309255, DOI:10.1109/VCIP.2012.6410841, ISBN: 978-1-4673-4405-0, Figure 1, Section 3, "Affine SKIP and DIRECT Modes".
Huang H., et al., "CE2: Alignment of Affine Control-point Motion Vector and Subblock Motion Vector (Test 2-5.2)", JVET-N0257, Joint Video Experts Team (JVET) of ITU-T SG 16 WP 3 and ISO/IEC JTC 1/SC 29/WG 11, 14th Meeting: Geneva, CH, Mar. 19-27, 2019, pp. 1-10.
Huang (Qualcomm) H., et al., "CE2-related: Alignment of Affine Control-point Motion Vector and Subblock Motion Vector," 125. MPEG Meeting, Jan. 9, 2019-Jan. 18, 2019, Marrakech, (Motion Picture Expert Group or ISO/IEC JTC1/SC29/WG11), No. m45369, Jan. 7, 2019 (Jan. 7, 2019), XP030213090, 4 pages, Retrieved from the Internet: URL: http://phenix.int-evry.fr/mpeg/doc_end_user/documents/125_Marrakech/wg11/m45369-JVET-M0110-v2-JVET-M0110_v2.zip JVET-M0110.docx, [retrieved on Jan. 7, 2019], the whole document.
IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.
International Search Report and Written Opinion—PCT/US2019/068396—ISA/EPO—dated Apr. 14, 2020.
ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 Pages.
ITU-T H.265, "Series H: Audiovisual and Multimedia Systems, Infrastructure of audiovisual services—Coding of moving video, High efficiency video coding," The International Telecommunication Union. Dec. 2016, 664 Pages.
Zhang N., et al., "Merge Mode for Deformable Block Motion Information Derivation", IEEE Transactions on Circuits and Systems for Video Technology, Institute of Electrical and Electronics Engineers, US, vol. 27, No. 11, Nov. 1, 2017 (Nov. 1, 2017), pp. 2437-2449, XP011672843, ISSN: 1051-8215, DOI: 10.1109/TCSVT.2016.2589818 [retrieved on Nov. 7, 2017], figure 5, Section III. "Proposed MERGE Mode".
Zhou M., et al., "CE4-Related: A Clean up for Affine Mode", Joint Video Experts Team (JVET) of ITU-T SG 16 WP 3 and ISO/IEC JTC 1/SC 29/WG 11, JVET- L0047-V1, 12th Meeting: Macao, CN, Oct. 3-12, 2018, pp. 1-9.
Huang H., et al., "CE2 Size Constrain for Inherited Affine Motion Prediction (Test 2.4.7)", Joint Video Experts Team (JVET) of ITU-T SG 16 WP 3 and ISO/IEC JTC 1/SC 29/WG 11, JVET-M0053, 13th Meeting: Marrakech, MA, Jan. 9-18, 2019, pp. 1-2.

* cited by examiner

SUBBLOCK BASED AFFINE MOTION MODEL

This application claims the benefit of U.S. Provisional Patent Application 62/786,117, filed Dec. 28, 2018, the entire content of which is hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques related to inter prediction in video codecs, and more specifically, to affine motion prediction. The example techniques may be applied to any of the existing and developing video codecs, such as HEVC (High Efficiency Video Coding), VVC (Versatile Video Coding) or be a coding tool corresponding to any other video coding standard. In an affine motion prediction mode, a current block of video data being coded (e.g., encoded or decoded) may be divided into subblocks, and a video coder (e.g., video encoder or video decoder) determines motion vectors for the subblocks based on control-point motion vectors (CPMVs) of control points (CPs) of the current block. In one or more examples described in this disclosure, a video coder (e.g., a video decoder or a video encoder) may select subblock motion vectors from subblocks as control-point motion vectors for the current block.

In one example, a method of processing video data includes: selecting, by one or more processors implemented in circuitry, two or more subblocks of one or more blocks of video data; generating, by the one or more processors, an affine motion model for a current block of video data using a subblock motion vector from each of the two or more subblocks as control-point motion vectors for the current block; determining, by the one or more processors, one or more prediction blocks based on the affine motion model; and predicting, by the one or more processors, the current block with the one or more prediction blocks.

In another example, a device for processing video data includes: a memory configured to store video data; and one or more processors implemented in circuitry and configured to: select two or more subblocks of one or more blocks of video data; generate an affine motion model for a current block of the video data using a subblock motion vector from each of the two or more subblocks as control-point motion vectors for the current block; determine one or more prediction blocks based on the affine motion model; and predict the current block with the one or more prediction blocks.

In one example, a computer-readable storage medium having stored thereon instructions that, when executed, cause a processor to: select two or more subblocks of one or more blocks of video data; generate an affine motion model for a current block of video data using a subblock motion vector from each of the two or more subblocks as control-point motion vectors for the current block; determine one or more prediction blocks based on the affine motion model; and predict the current block with the one or more prediction blocks.

In another example, a device for coding video data includes: means for selecting two or more subblocks of one or more blocks of video data; means for generating an affine motion model for a current block of video data using a subblock motion vector from each of the two or more subblocks as control-point motion vectors for the current block; means for determining one or more prediction blocks based on the affine motion model; and means for predicting the current block with the one or more prediction blocks.

The details of one or more examples are set forth in the accompanying drawings and the description below. Other features, objects, and advantages will be apparent from the description, drawings, and claims.

DETAILED DESCRIPTION

As described in more detail below, the disclosure describes example techniques for using subblocks motion vectors as control-point motion vectors (CPMVs) for control points (CPs) of a current block of video data that is coded (e.g., encoded or decoded) in an affine motion compensation mode. In some examples of affine motion compensation mode, the current block may be coded by dividing the current block into a plurality of subblocks and performing motion compensation of each of the subblocks. To perform the motion compensation, a video coder (e.g., video encoder or video decoder) may determine motion vectors for one or more of the subblocks to determine respective prediction blocks for the subblocks. In affine motion compensation mode, the motion vectors for the subblocks are based on the motion vectors for the CPs of the current block (e.g., based on the CPMVs of the current block). Rather than using, CPs in two or more of the corner points of the current block, a video coder (e.g., a video decoder or a video encoder) may use subblock motion vectors associated (e.g., assigned to) with subblocks as control-point motion vectors for the current block. In this way, the video coder may consume less storage in a buffer compared to systems that use CPMVs that are stored in a CPMV buffer.

In one or more examples described herein, the video coder is configured to generate a 6-parameter affine motion compensation model using three subblock motion vectors associated with three subblocks as control-point motion vectors for the current block. However, such examples are also applicable to other affine motion compensation models. For instance, examples that generate a 6-parameter affine motion compensation model using two subblock motion vectors associated with two subblocks as control-point motion vectors for the current block may apply to examples that generate a 4-parameter affine motion compensation model.

Figure 1:
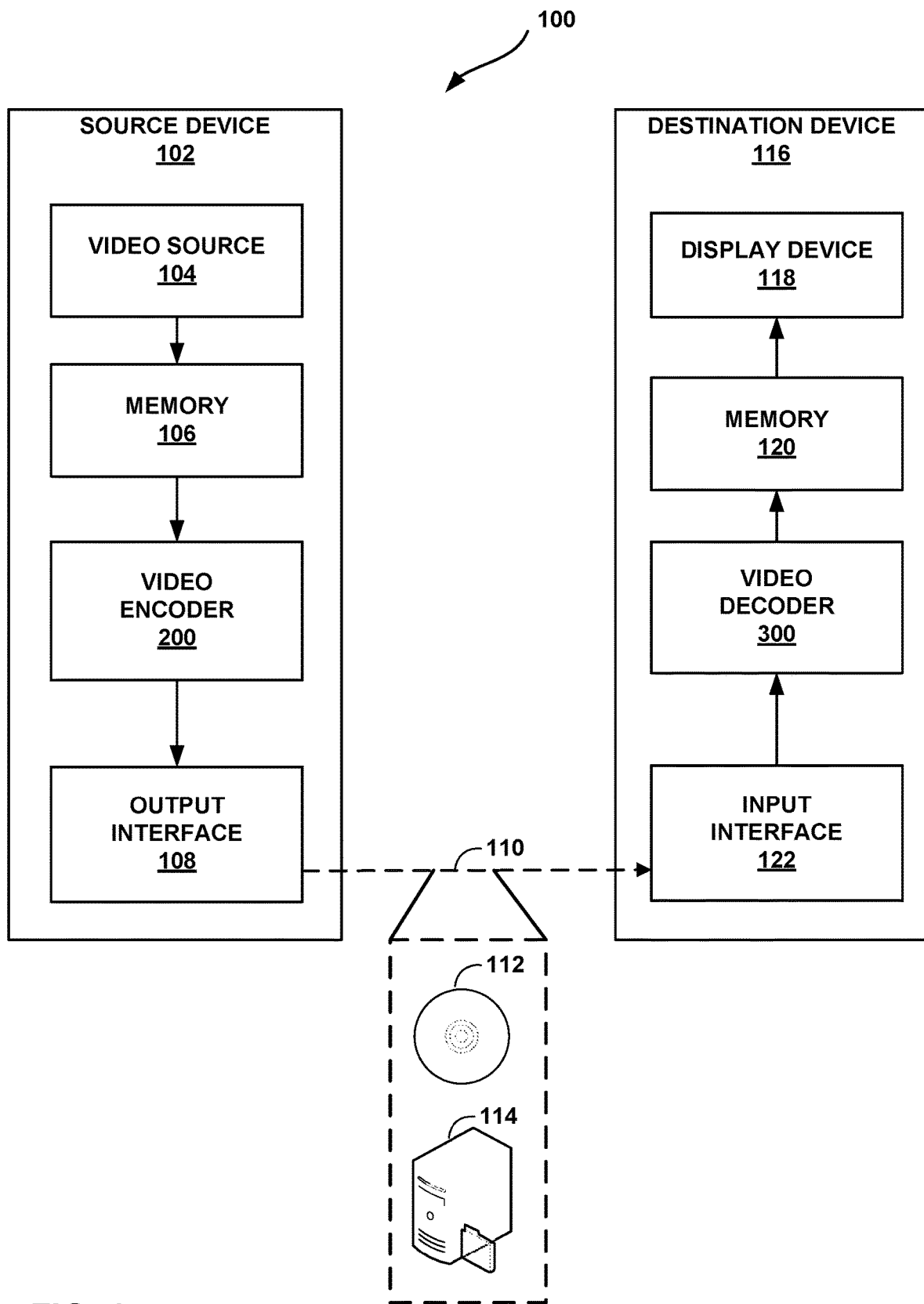
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including a computer (e.g, a desktop computer, a notebook (e.g., laptop) computers, tablet computers, etc.), a set-top box, a mobile device, (e.g., smartphone), a television, a camera, a display device, a digital media player, a video gaming console, a video streaming device (e.g., a broadcast receiver device), or other devices. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for using affine motion compensation, determining a prediction block for a current block using the motion vector and using subblock motion vectors as control-point motion vectors. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for using affine motion compensation, determining a prediction block for a current block using the motion vector and using subblock motion vectors as control-point motion vectors. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally, or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to destination device 116. Similarly, destination device 116 may access encoded data from destination device 116 via input interface 122. Destination device 116 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 7)," Joint Video Experts Team (WET) of ITU-T SG 16 WP 3 and ISO/IEC JTC 1/SC 29/WG 11, $16^{th}$ Meeting: Geneva, CH, 1-11 Oct. 2019, JVET-P2001-v9 (hereinafter "VVC Draft 7"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, a video coder (video encoder 200 or video decoder 300) may be configured to select two or more subblocks of one or more blocks of video data. In this example, the video coder may generate an affine motion model for a current block of video data using a subblock motion vector from each of the two or more subblocks as control-point motion vectors for the current block. The video coder may determine one or more prediction blocks based on the affine motion model and predict the current block with the one or more prediction blocks.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

As described above, video encoder 200 and video decoder 300 may be configured to predict a current block of video data in an affine motion compensation mode. To perform prediction in affine motion compensation mode, in some examples, video encoder 200 and video decoder 300 may divide each block of video data (e.g., a current block, a neighboring block, etc.) into a plurality of subblocks. In this example, video encoder 200 and video decoder 300 may be configured to select subblock MVs of the plurality of subblocks as CPMVs for the current block. Video encoder 200 and video decoder 300 may determine motion vectors for the subblocks based on the CPMVs using equations described in more detail below.

Video encoder 200 and video decoder 300 encode or decode the current block by encoding or decoding the subblocks based on respective motion vectors of the subblocks. For example, video encoder 200 and video decoder 300 determine respective prediction blocks for one or more of the subblocks based on respective motion vectors of the one or more subblocks. Video encoder 200 determines a residual data representing a difference between the prediction blocks and the subblocks and signals information indicative of the residual data. Video decoder 300 receives the information indicative of the residual data and adds the residual data to respective prediction blocks to reconstruct the subblocks, and in that way reconstructs the current block.

To reduce the amount of data video encoder 200 needs to signal, rather than video encoder 200 signaling the values of CPMVs for the current block, video decoder 300 may determine the values of the subblock MVs used as CPMVs based on motion vectors of neighboring blocks. In some examples, video decoder 300 may construct a candidate list of motion vectors from neighboring blocks that could be used to determine the CPMVs for the current block. The candidate list may include inherited candidates and constructed candidates. Inherited candidates refer to CPMVs of neighboring blocks, assuming neighboring blocks are coded in affine motion compensation mode. However, there may be no certainty that neighboring blocks are coded in affine motion compensation mode. Constructed candidates refer to temporal motion vectors (e.g., motion vectors of neighboring blocks that refer to the prediction block of the neighboring blocks). Motion vectors of neighboring blocks that refer to the prediction block of the neighboring block are referred to as temporal motion vectors of neighboring blocks.

Video encoder 200 may also construct a candidate list that includes inherited candidates and constructed candidates in the same way that video decoder 300 constructs the candidate list, such that the candidate list from video encoder 200 and the candidate list from video decoder 300 are the same candidate list. Video encoder 200 may signal an index into the candidate list, and video decoder 300 receives the index into the candidate list. Video encoder 200 and video decoder 300 may utilize the candidate identified by the index to determine the subblock MVs used as the CPMVs for the current block. The candidate may be motion vector information such as the subblock MVs used as CPMVs for neighboring blocks (e.g., an inherited candidate) or motion vector information such as temporal motion vectors for neighboring blocks (e.g., a constructed candidate), as two examples. It may be possible that some of the subblock MVs used as the CPMVs for the current block are from an inherited candidate and other the subblock MVs used as CPMVs for the current block are from a constructed candidate.

In some cases, the subblock MVs used as the CPMVs for the current block may not be optimal. Accordingly, some techniques include refining the subblock MVs used as the CPMVs of the current block (e.g., such as adding an offset to the subblock MV). For instance, a motion vector includes an x-component and a y-component. In some techniques, video encoder 200 and video decoder 300 may add a first offset to the x-component of the subblock MVs used as the CPMVs of the current block and add a second offset to the y-component of the subblock MVs used as the CPMVs of the current block. Video encoder 200 may signal information indicative of the offset, and video decoder 300 may receive the information indicative of the offset. Video encoder 200 and video decoder 300 may then utilize the refined subblock MVs as CPMVs for the affine motion compensation mode prediction of the current block.

In accordance with techniques described in this disclosure, rather than first determining and storing CPMVs for the current block and then determining and storing subblock MVs for the current block, video encoder 200 and video decoder 300 may select subblock MVs as CPMVs. In other words, in some techniques, video encoder 200 and video decoder 300 may avoid storing CPMVs in a CPMV buffer and instead use MVs already stored in a buffer for a current block. For example, video encoder 200 may be configured to select two or more subblocks of one or more blocks of video data and generate an affine motion model for a current block of video data using a subblock motion vector from each of the two or more subblocks as control-point motion vectors for the current block. In this example, the video encoder 200 may be configured to determine one or more prediction blocks based on the affine motion model and predict the current block with the one or more prediction blocks.

In some examples, video decoder 300 may be configured select two or more subblocks of one or more blocks of video data and generate an affine motion model for a current block of video data using a subblock motion vector from each of the two or more subblocks as control-point motion vectors for the current block. In this example, the video decoder 300 may be configured to determine one or more prediction blocks based on the affine motion model and predict the current block with the one or more prediction blocks.

Figure 2A:
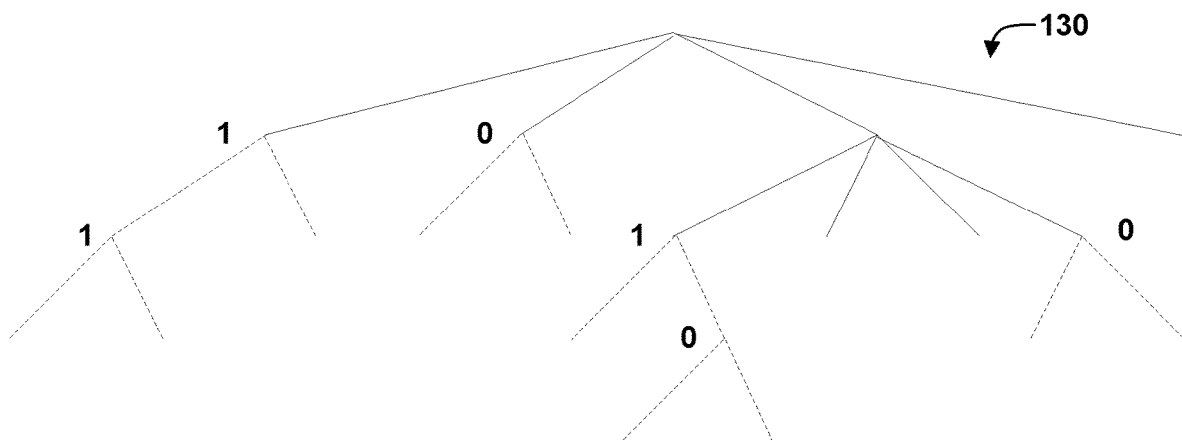
FIGS. 2A and 2B are conceptual diagrams illustrating an example quadtree binary tree (QTBT) structure, and a corresponding coding tree unit (CTU).
Figure 2B:
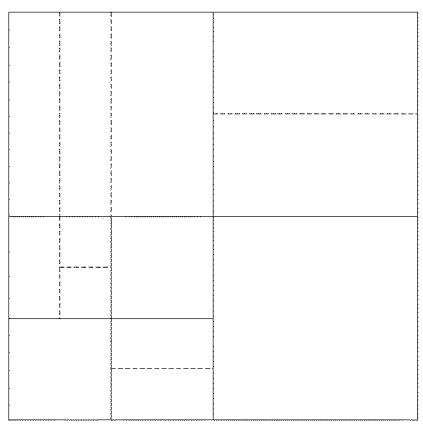

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 subblocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs and are further processed according to prediction and transform without further partitioning.

Figure 3:
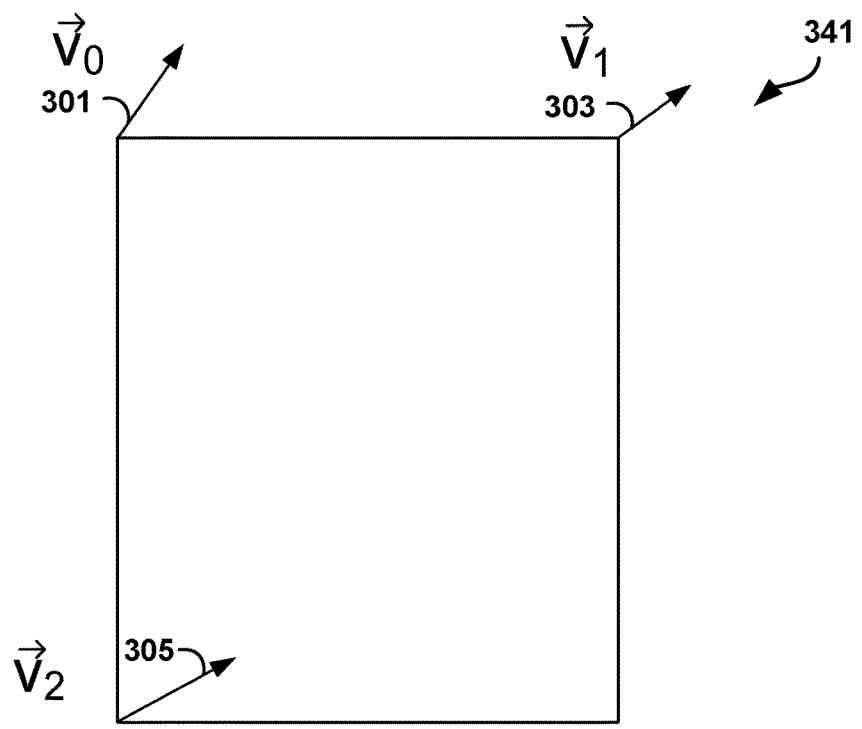
FIG. 3 shows an example of a current block of video data with three motion vectors.

FIG. 3 shows an example of a current block 341 of video data with three motion vectors. An affine motion model can be described as follows.

$$\begin{cases} v_x = ax + by + e \\ v_y = cx + dy + f \end{cases} \quad 1)$$

wherein $(v_x, v_y)$ is the motion vector at the coordinate (x, y), and a, b, c, d, e, and f are the six parameters. This disclosure refers to this affine motion model as a "6-parameters affine motion model." In some video coders (e.g., video encoder 200, video decoder 300, etc.), a picture is partitioned into blocks for block-based coding. The affine motion model for a block can also be described by the CPMV $\vec{v}_0$ 301, where $\vec{v}_0 = (v_{0x}, v_{0y})$, CPMV $\vec{v}_1$ 303, where $\vec{v}_1 = (v_{1x}, v_{1y})$, and CPMV $\vec{v}_2$ 305, where $\vec{v}_2 = (v_{2x}, v_{2y})$. In this example, CPMV $\vec{v}_0$ 301, CPMV $\vec{v}_1$ 303, and CPMV $\vec{v}_2$ 305 are at coordinates corresponding to three different locations that are not in the same line. The three locations are usually referred to as control-points (CPs). In the case when the three control-points are at the three corners of the block as shown in FIG. 3, the affine motion can be described as follows.

$$\begin{cases} v_x = \frac{(v_{1x} - v_{0x})}{blkW} x + \frac{(v_{2x} - v_{0x})}{blkH} y + v_{0x} \\ v_y = \frac{(v_{1y} - v_{0y})}{blkW} x + \frac{(v_{2y} - v_{0y})}{blkH} y + v_{0y} \end{cases} \quad 2)$$

wherein blkW and blkH are the width and height of the block.

Figure 4:
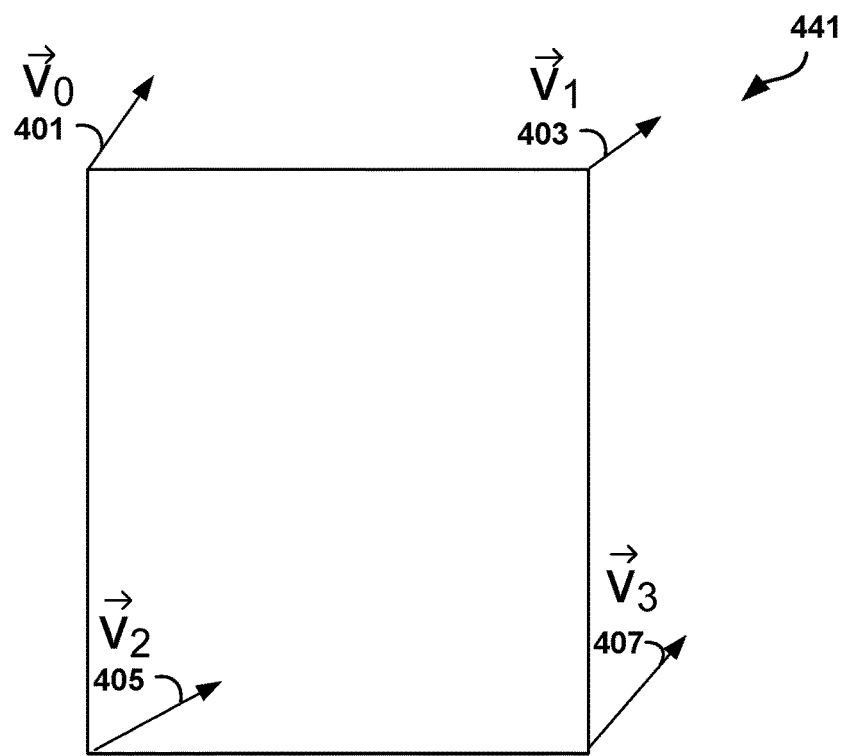
FIG. 4 shows an example of a current block of video data with four motion vectors.

FIG. 4 shows an example of a current block 441 of video data with four motion vectors. A simplified 4-parameters affine motion compensation model (for zoom and rotational motion) is described as follows.

$$\begin{cases} v_x = ax + by + e \\ v_y = bx + ay + f \end{cases} \quad 3)$$

The simplified 4-parameters affine motion compensation model for a block can be described by a combination of two of CPMVs 401-407. In this example, a video coder (video encoder 200 or video decoder 300) may use CPMV 401, where $\vec{v}_0 = (v_{0x}, v_{0y})$, and CPMV $\vec{v}_1$ 403, where $\vec{v}_1 = (v_{1x}, v_{1y})$, at the two corners of the block. The motion field is then described as follows.

$$\begin{cases} v_x = \frac{(v_{1x} - v_{0x})}{blkW} x - \frac{(v_{1y} - v_{0y})}{blkH} y + v_{0x} \\ v_y = \frac{(v_{1y} - v_{0y})}{blkW} x + \frac{(v_{1x} - v_{0x})}{blkH} y + v_{0y} \end{cases} \quad 4)$$

Given an affine motion model for a block, a video coder (video encoder 200 or video decoder 300) may derive different motion vectors for each pixel in the block. Therefore, the video coder may perform motion compensation pixel-by-pixel.

Figure 5:
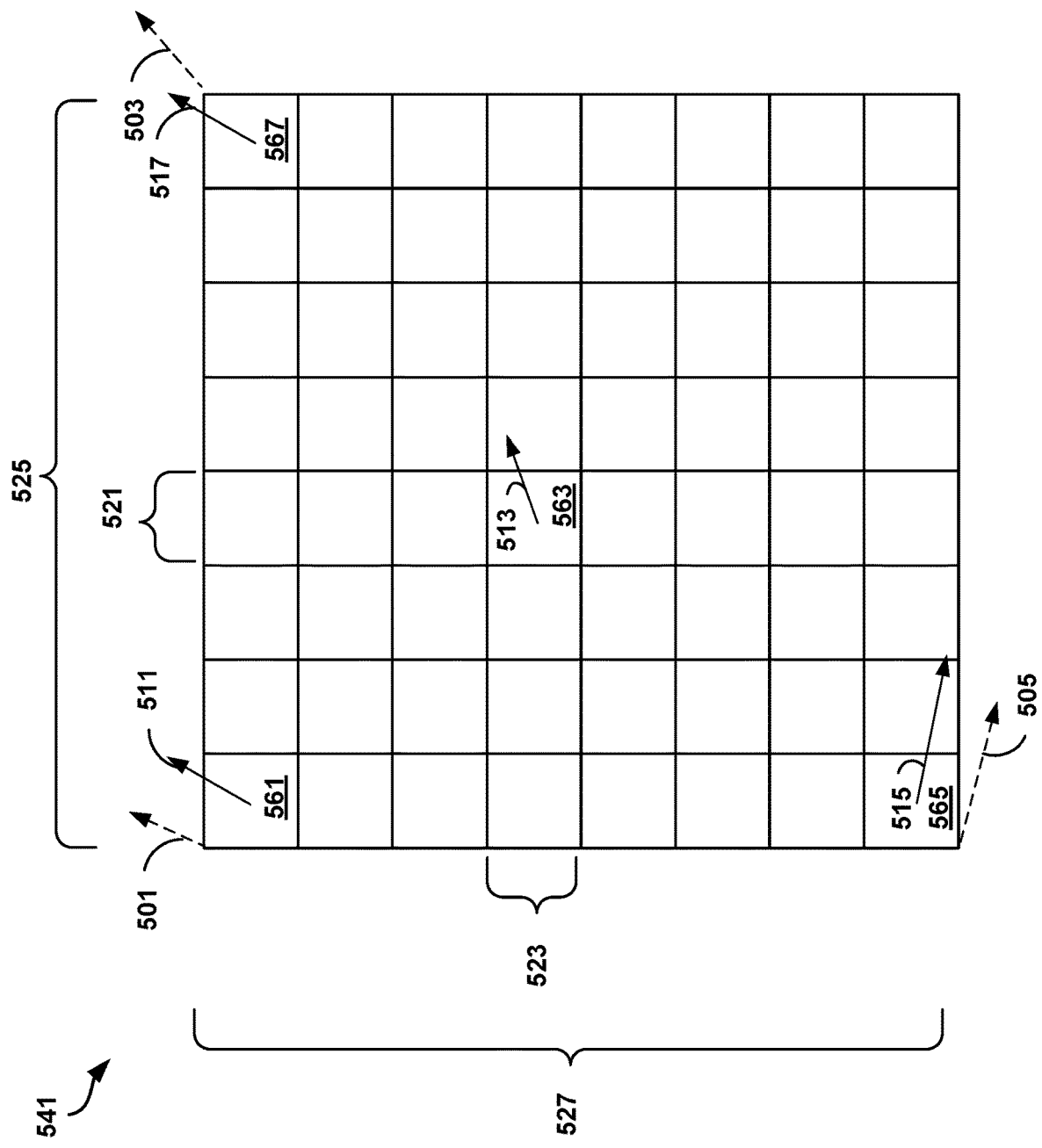
FIG. 5 shows an example of subblock-based affine motion compensation using control-point motion vectors (CPMVs) at corners of a current block.

FIG. 5 shows an example of subblock-based affine motion compensation using CPMVs 501-505 at corners of current block 541. To reduce the complexity, a video coder (e.g., video encoder 200 or video decoder 300) may adapt subblock-based motion compensation, where a current block 541 is partitioned into multiple subblocks (that each have smaller block size) and each subblock is associated with one motion vector for motion compensation. The video coder may derive the motion vector for each subblock using the representative coordinate of the subblock. In some examples, the video coder may use the center position. In some examples, however, the video coder may use a different position (e.g., a corner of a subblock). In some examples, the video coder may partition the block into non-overlapping subblocks. The block width is blkW 525, the block height is blkH 527, the subblock width is sbW 521 and the subblock height is sbH 523. There are blkH/sbH rows of subblocks and blkW/sbW subblocks in each row of current block 541. For a six-parameter affine motion model, the video coder may derive the motion vector for the subblock (referred to as subblock MV) at $i_{th}$ row (0<=i<blkW/sbW) and $j_{th}$ (0<=j<blkH/sbH) column as follows.

$$\begin{cases} v_x = \frac{(v_{1x} - v_{0x})}{blkW}\left(j*sbW + \frac{sbW}{2}\right) + \frac{(v_{2x} - v_{0x})}{blkH}\left(i*sbH + \frac{sbH}{2}\right) + v_{0x} \\ v_y = \frac{(v_{1y} - v_{0y})}{blkW}\left(j*sbW + \frac{sbW}{2}\right) + \frac{(v_{2y} - v_{0y})}{blkH}\left(i*sbH + \frac{sbH}{2}\right) + v_{0y} \end{cases} \quad 5)$$

where $(v_x, v_y)$ is a motion vector at coordinates (x, y) for a subblock positioned at row i and column j of current block 541. For instance, subblock 561 is arranged in a first row and a first column such that i equals one and j equals one and subblock 567 is arranged in a first row and an eighth column such that i equals one and j equals eight.

A video coder (e.g., video encoder 200 or video decoder 300) may derive subblock MVs 511-517. Note that CPMV $\vec{v}_0$ 501 (referred to herein as simply "CPMV 501"), CPMV $\vec{v}_1$ 503 (referred to herein as simply "CPMV 503"), CPMV $\vec{v}_2$ 505 (referred to herein as simply "CPMV 505") are different from any of the subblock MVs 511-517, as shown in FIG. 5. For example, the video coder may determine (e.g., using information signaled in a bitstream, using information from a previously decoded block, etc.) CPMVs 501-505 and store CPMVs 501-505 in a CPMV buffer. In this example, the video coder may derive the motion vector for the subblock using equation 5. For instance, the video coder may derive subblock motion vector (MV) 511 for subblock 561 using CPMVs 501-505, derive subblock MV 513 for subblock 563 using CPMVs 501-505, derive subblock MV 515 for subblock 565 using CPMVs 501-505, and derive MV 517 for subblock 567 using CPMVs 501-505. In this instance, the video coder may store MVs 561-567 in a subblock MV buffer and store CPMVs 501-505 in a CPMV buffer.

Therefore, the video coder may use two types of MV buffers (e.g., a CPMV buffer and a subblock MV buffer) for an affine motion model. One of the MV buffers is the CPMV buffer which store the CPMVs, and the other of the MV buffers is the subblock MV buffer which store the subblock MVs. In some examples, the subblock MV buffer is the same as for normal motion, wherein the MVs are used for motion compensation, deblocking, normal MV prediction, etc. As such, the CPMV buffer is an additional buffer to store the affine CPMVs.

Figure 6:
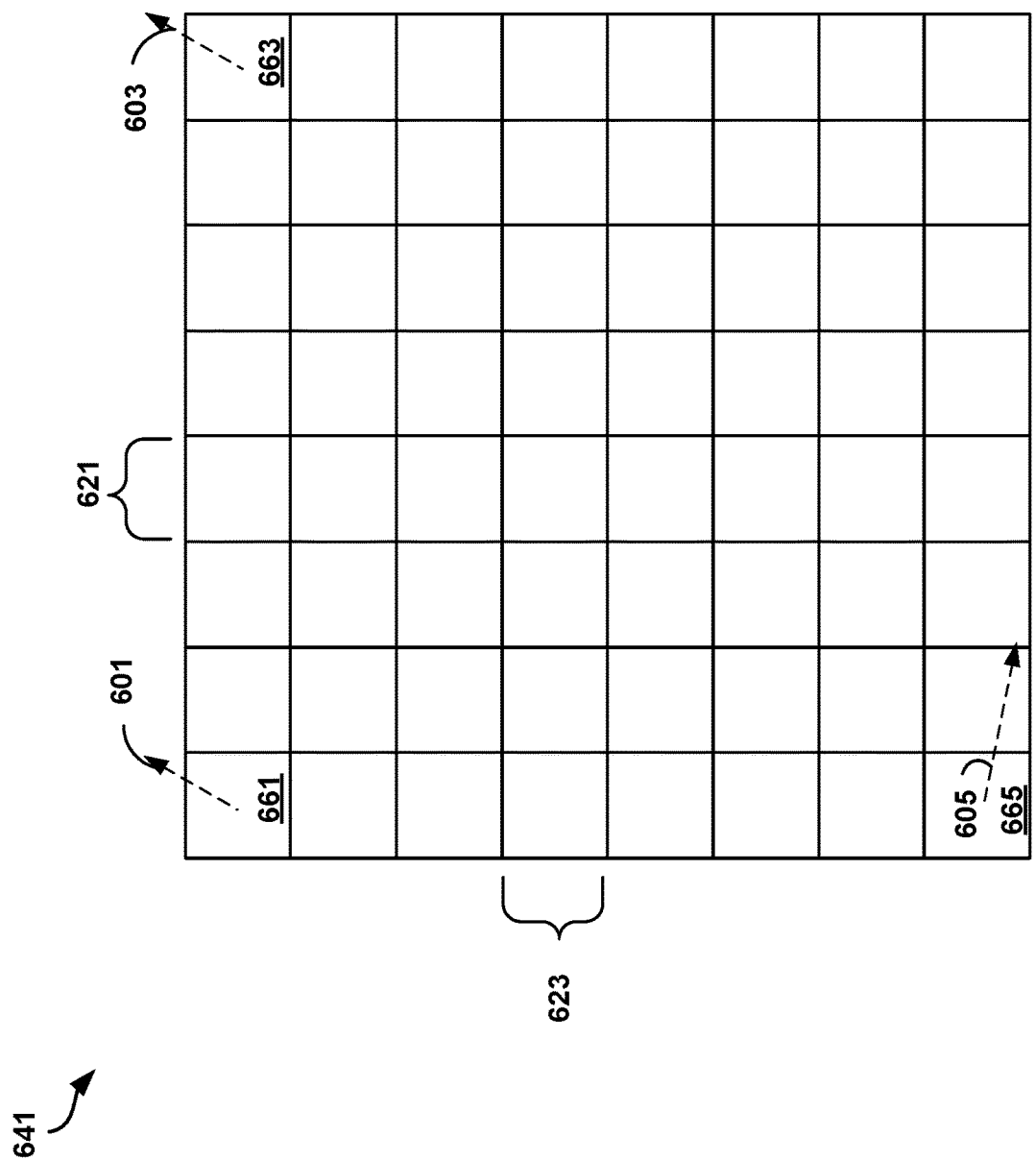
FIG. 6 shows an example of subblock-based affine motion compensation using corner subblocks of a current block.

FIG. 6 shows an example of subblock-based affine motion compensation using corner subblocks of a current block 641. In this example, CPMV $\vec{v}_0$ 601 (referred to herein as simply "CPMV 601") is a subblock MV for subblock 661, CPMV $\vec{v}_1$ 603 (referred to herein as simply "CPMV 603") is a subblock MV for subblock 663, and CPMV $\vec{v}_2$ 605 (referred to herein as simply "CPMV 605") is a subblock MV for subblock 665. In this way, a video coder (video encoder 200 or video decoder 300) may use the subblock MVs as CPMVs such that no additional CPMV buffer is needed. The coordinates of the CPMVs are the representative coordinates of the subblocks, for example, the center position. For example, let (x, y) be the coordinate of the top-left pixel of a subblock, then the coordinate of the center position may be defined as (x+sbW/2, y+sbH/2), wherein sbW 621 and sbH 623 are the width and height of the subblock respectively. For the 6-parameter affine motion model, the video coder may select three subblocks (therefore three subblock MVs) for CPMV. That is, a video coder (video encoder 200 or video decoder 300) may generate an affine motion model using three subblock motion vectors as control-point motion vectors for a current block. For a 4-parameter affine motion model, the video coder may select 2 subblocks (therefore 2 subblock MVs) for CPMV.

That is, a video coder (video encoder 200 or video decoder 300) may generate an affine motion model using two subblock motion vectors as control-point motion vectors for a current block. These subblocks are referred to as CPMV subblocks in this disclosure. Without loss of generality, the processes for 6-parameter affine motion model are described. However, a corresponding process for 4-parameter affine motion model can be similarly applied.

Denote the coordinate of the CPMVs ($\vec{v}_0$, $\vec{v}_1$, and $\vec{v}_2$) as (x0, y0) for current block 641, (x1, y1) for current block 641, and (x2, y2) for current block 641. That is, in the example of FIG. 6, CPMV 601 is at coordinates (x0, y0), CPMV 603 is at coordinates (x1, y1), and CPMV 605 is at coordinates (x2, y2). In this example, a video coder (video encoder 200 or video decoder 300) may select the CPMV subblocks such that y0 equals to y1, and x0 equals to x2. In this example, the affine motion model is described as follows.

$$\begin{cases} v_x = \frac{(v_{1x} - v_{0x})}{x1 - x0}x + \frac{(v_{2x} - v_{0x})}{y2 - y0}y + v_{0x} \\ v_y = \frac{(v_{1y} - v_{0y})}{x1 - x0}x + \frac{(v_{2y} - v_{0y})}{y2 - y0}y + v_{0y} \end{cases} \quad 6)$$

In the example of FIG. 6, a video coder (video encoder 200 or video decoder 300) may use the corner subblocks for CPMV subblocks. The coordinates of the CPMVs are (cx+sbW/2, cy+sbH/2), (cx+blkW-sbW/2, cy+sbH/2), and (cx+sbW/2, cy+blkH-sbH/2), wherein (cx,cy) is the coordinate of the top-left pixel of the block. Said differently, CPMV 601 is at coordinate (cx+sbW/2, cy+sbH/2), CPMV 603 is at coordinate (cx+blkW-sbW/2, cy+sbH/2), and CPMV 605 is at coordinate (cx+sbW/2, cy+blkH-sbH/2). That is, the video coder may select a subblock 661 of current block 641 arranged in an upper-left corner of the current block, select subblock 663 of current block 641 arranged in an upper-right corner of the current block, and select subblock 665 of current block 641 arranged in a lower-left corner of current block 641.

A video coder may be configured such that (x1−x0) and (y2−y0) are a power of 2 so that the division operations can be performed by right shifting of log 2(x1−x0) and log 2(y2−y0), respectively. That is, a video coder (video encoder 200 or video decoder 300) may select a first subblock associated with a subblock motion vector with coordinates at (x0, y0) for a current block (e.g., current block 641). In this example, the video coder may select a second subblock associated with a subblock motion vector with coordinates at (x1, y1) for the current block, where y0 equals y1. The video coder may select a third subblock associated with a subblock motion vector with coordinates at (x2, y2) for the current block, where x0 equals x2.

However, in this CPMV subblock selection method, x1−x0 is blkW-sbH and y2−y0 is blkH-sbH, which are typically not power of 2. For example, when blkW equals 32 and sbW equals 4, then x1−x0 is 28. Therefore, a video coder may adapt a look-up-table operation (also referred to herein as "LUT operation") to replace the division operation by multiplication and right shifting. That is, to generate an affine motion model for current block 641, a video coder may be configured to calculate equation 7 and/or equation 8. In the LUT method, m divided by n is approximated as (m*LUT[n])>>LUT_PRECISION, wherein LUT[n]= (1<<LUT_PRECISION)/n, and LUT_PRECISION is predefined precision for the approximation. In some examples, equation (6) is modified as follows.

$$\begin{cases} v_x = ((v_{1x} - v_{0x}) * x * LUT[x1 - x0] + (v_{2x} - v_{0x}) * y * LUT[y2 - y0] + \\ \quad (v_{0x} \ll \text{LUT\_PRECISION})) \gg \text{LUT\_PRECISION} \\ v_y = ((v_{1y} - v_{0y}) * x * LUT[x1 - x0] + (v_{2y} - v_{0y}) * y * LUT[y2 - y0] + \\ \quad (v_{0y} + \text{LUT\_PRECISION})) \gg \text{LUT\_PRECISION} \end{cases} \quad 7)$$

In another example, equation (6) is modified as follows.

$$\begin{cases} v_x = ((v_{1x} - v_{0x}) * x * LUT[x1 - x0]) \gg LUT_{PRECISION} + \\ \quad ((v_{2x} - v_{0x}) * y * LUT[y2 - y0]) \gg \text{LUT\_PRECISION} + v_{0x} \\ v_y = ((v_{1y} - v_{0y}) * x * LUT[x1 - x0]) \gg LUT_{PRECISION} + \\ \quad ((v_{2y} - v_{0y}) * y * LUT[y2 - y0]) \gg \text{LUT\_PRECISION} + v_{0y} \end{cases} \quad 8)$$

Figure 7:
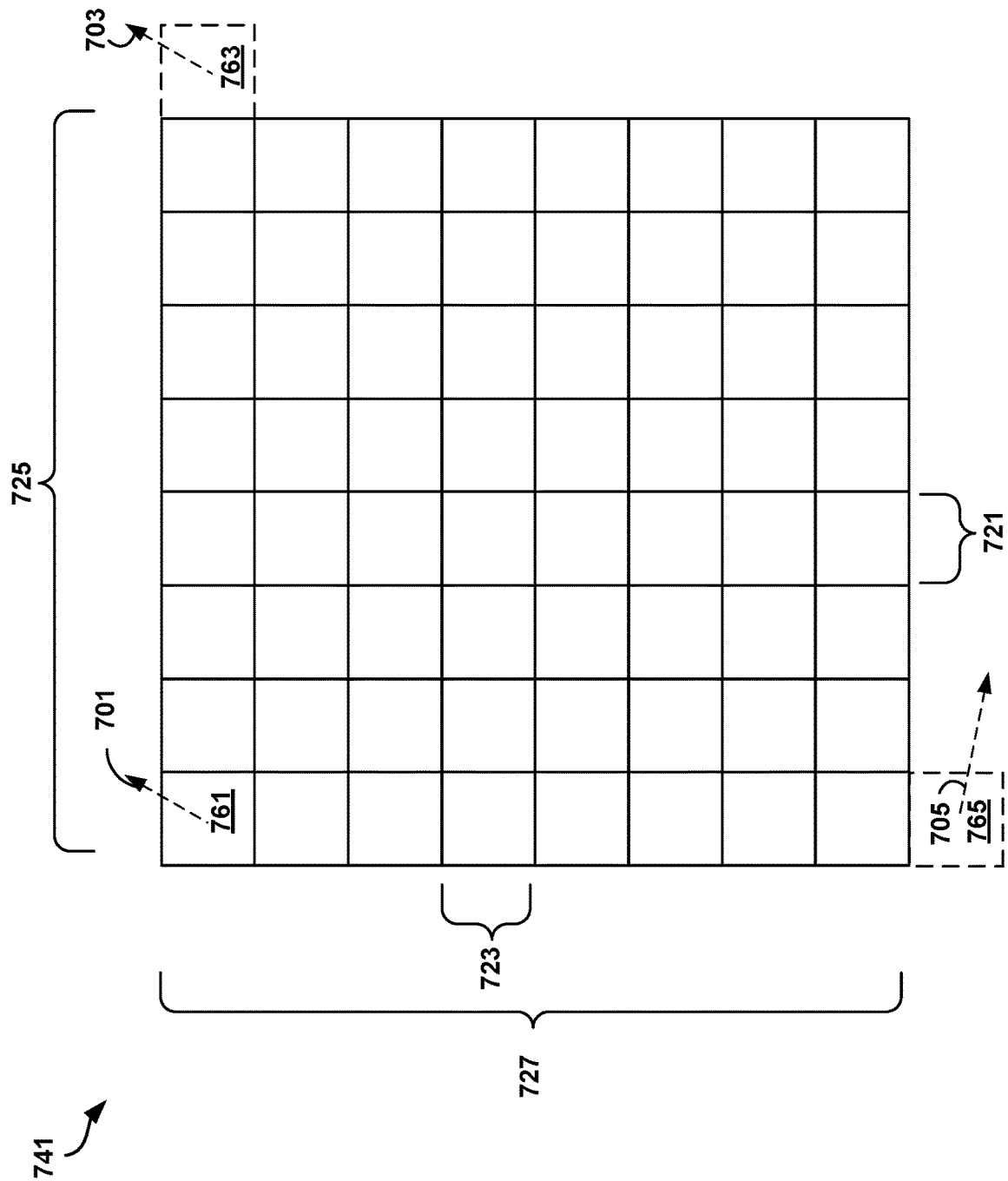
FIG. 7 shows a first example of subblock-based affine motion compensation using subblocks at an extended column and row of a current block of video data.

FIG. 7 shows a first example of subblock-based affine motion compensation using subblocks at an extended column and row of a current block 741 of video data. In the example of FIG. 7, some and/or all of the CPMV subblocks are located at the extended column and row of the block, such that (x1−x0) and (y2−y0) are both power of 2. Said differently, for example, a video coder (video encoder 200 or video decoder 300) may select a subblock at an extended column and an extended row of the current block. That is, in the example of FIG. 7, CPMV $\vec{v}_0$ 701 (referred to herein as simply "CPMV 701") is at coordinates (x0, y0) for current block 741 and associated with (e.g., assigned to) subblock 761 of current block 741. In this example, CPMV 703 is at coordinates (x1, y1) for current block 741 and associated with subblock 763 of an extended column. CPMV 705 is at coordinates (x2, y2) for current block 741 and associated with subblock 765 of an extended row. In this example, (x1−x0) and (y2−y0) are both power of 2. More specifically as shown in FIG. 7, x1−x0 is a width of current block 741 and y2−y0 is a height of current block 741.

Said differently, for example, a video coder (video encoder 200 or video decoder 300) may select a first subblock (e.g., subblock 761) associated with a subblock motion vector (e.g., subblock MV 701) with coordinates at (x0, y0) for a current block (e.g., current block 741). In this example, the video coder may select a second subblock (e.g., subblock 763) associated with a subblock motion vector (subblock MV 703) with coordinates at (x1, y1) for the current block. In this example, x1−x0 is a width of current block 741. The video coder may select a third subblock (e.g., subblock 765) associated with a subblock motion vector (e.g., subblock MV 705) with coordinates at (x2, y2) for the current block. In this example, y2−y0 is a height of current block 741.

More specifically, the coordinates of CPMVs 701-705 are (cx+sbW/2, cy+sbH/2), (cx+blkW+sbW/2, cy+sbH/2), and (cx+sbW/2, cy+blkH+sbH/2), where blkW 725 is a width of current block 725, blkH 727 is a height of current block 725, sbH 723 is height of subblocks 761-765, and sbW 721 is a width of subblocks 761-765. For instance, CPMV 701 is at coordinate (cx+sbW/2, cy+sbH/2), CPMV 703 is at coordinate (cx+blkW+sbW/2, cy+sbH/2), and CPMV 705 is at coordinate (cx+sbW/2, cy+blkH+sbH/2). Therefore, x1−x0 is blkW 725 and y2−y0 is blkH 727, which are typically both power of 2. That is, to generate an affine motion model, a video coder may be configured to calculate equation 9. The equation (5) becomes as follows:

$$\begin{cases} v_x = \frac{(v_{1x} - v_{0x})}{blkW} * j * sbW + \frac{(v_{2x} - v_{0x})}{blkH} * i * sbH + v_{0x} \\ v_y = \frac{(v_{1y} - v_{0y})}{blkW} * j * sbW + \frac{(v_{2y} - v_{0y})}{blkH} * i * sbH + v_{0y} \end{cases} \quad 9)$$

Said differently, for example, a video coder (video encoder 200 or video decoder 300) may select a first subblock (e.g., subblock 761) associated with a first control-point motion vector (e.g., subblock MV 701) of the control-point motion vectors with coordinates at (cx+sbW/2, cy+sbH/2). In this example, (cx,cy) is a coordinate of the top-left pixel of current block 741). The video coder may select a second subblock (e.g., subblock 763) associated with a second control-point motion vector (e.g., subblock MV 703) of the control-point motion vectors with coordinates at (cx+blkW+sbW/2, cy+sbH/2). In this example, the video coder may select a third subblock (e.g., subblock 765) associated with a third control-point motion vector (e.g., subblock MV 705) of the control-point motion vectors with coordinates at (cx+sbW/2, cy+blkH+sbH/2).

Figure 8:
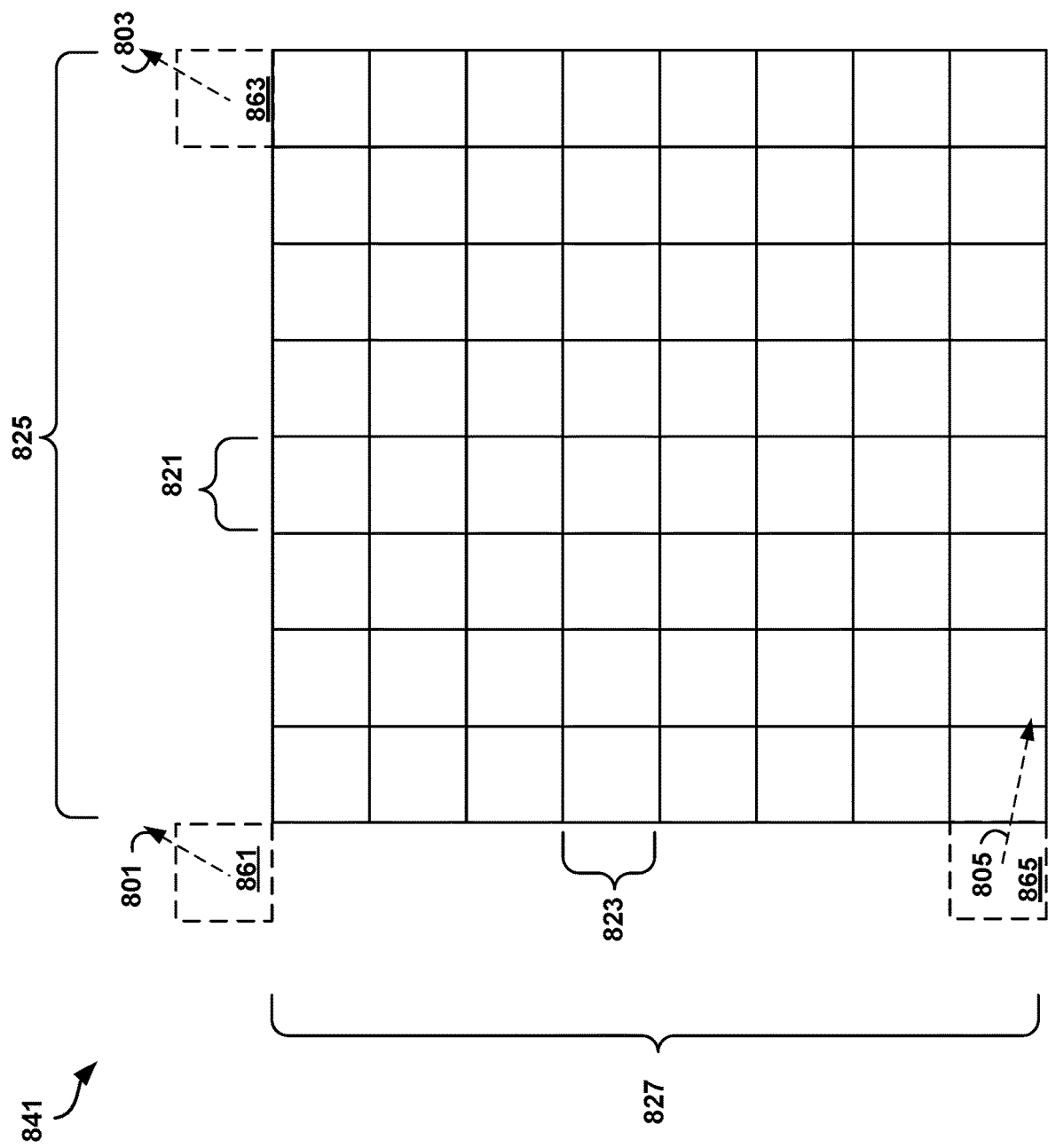
FIG. 8 shows a second example of subblock-based affine motion compensation using subblocks at an extended column and row of a current block of video data.

FIG. 8 shows a second example of subblock-based affine motion compensation using subblocks at an extended column and row of a current block 841 of video data. In the example of FIG. 8, the coordinates of CPMV are (cx−sbW/2, cy−sbH/2), (cx+blkW−sbW/2, cy−sbH/2), and (cx−sbW/2, cy+blkH−sbH/2), where blkW 825 is a width of current block 825, blkH 827 is a height of current block 841, sbH 823 is a height of subblocks 861-865, and sbW 821 is width of subblocks 861-865. For instance, CPMV $\vec{v}_0$ 801 (referred to herein as simply "CPMV 801") is at coordinate (cx−sbW/2, cy−sbH/2) and associated with (e.g., assigned to) subblock 861 of an extended row and an extended column. CPMV $\vec{v}_1$ 803 (referred to herein as simply "CPMV 803") is at coordinate (cx+blkW−sbW/2, cy−sbH/2) and associated with subblock 863 of an extended row. CPMV $\vec{v}_2$ 805 (referred to herein as simply "CPMV 805") is at coordinate (cx−sbW/2, cy+blkH−sbH/2) and associated with subblock 865 of an extended column.

Said differently, for example, a video coder (video encoder 200 or video decoder 300) may select a first subblock (e.g., subblock 861) associated with a first control-point motion vector (e.g., subblock MV 801) of the control-point motion vectors with coordinates at (cx−sbW/2, cy−sbH/2). In this example, (cx,cy) is a coordinate of the top-left pixel of current block 841). The video coder may select a second subblock (e.g., subblock 863) associated with a second control-point motion vector (e.g., subblock MV 803) of the control-point motion vectors with coordinates at (cx+blkW−sbW/2, cy−sbH/2). In this example, the video coder may select a third subblock (e.g., subblock 865) associated with a third control-point motion vector (e.g., subblock MV 805) of the control-point motion vectors with coordinates at (cx−sbW/2, cy+blkH−sbH/2).

That is, in the example of FIG. 8, CPMV 801 is at coordinates (x0, y0) for current block 841, CPMV 803 is at coordinates (x1, y1) for current block 841, and CPMV 805 is at coordinates (x2, y2) for current block 841. Therefore, x1−x0 and y2−y0 are also blkW 825 and blkH 823, respectively, which are typically both a power of 2. That is, to generate an affine motion model, a video coder may be configured to calculate equation 10. The equation (5) becomes as follows:

$$\begin{cases} v_x = \frac{(v_{1x} - v_{0x})}{blkW} * (j+1) * sbW + \frac{(v_{2x} - v_{0x})}{blkH} * (i+1) * sbH + v_{0x} \\ v_y = \frac{(v_{1y} - v_{0y})}{blkW} * (j+1) * sbW + \frac{(v_{2y} - v_{0y})}{blkH} * (i+1) * sbH + v_{0y} \end{cases} \quad 10)$$

Figure 9:
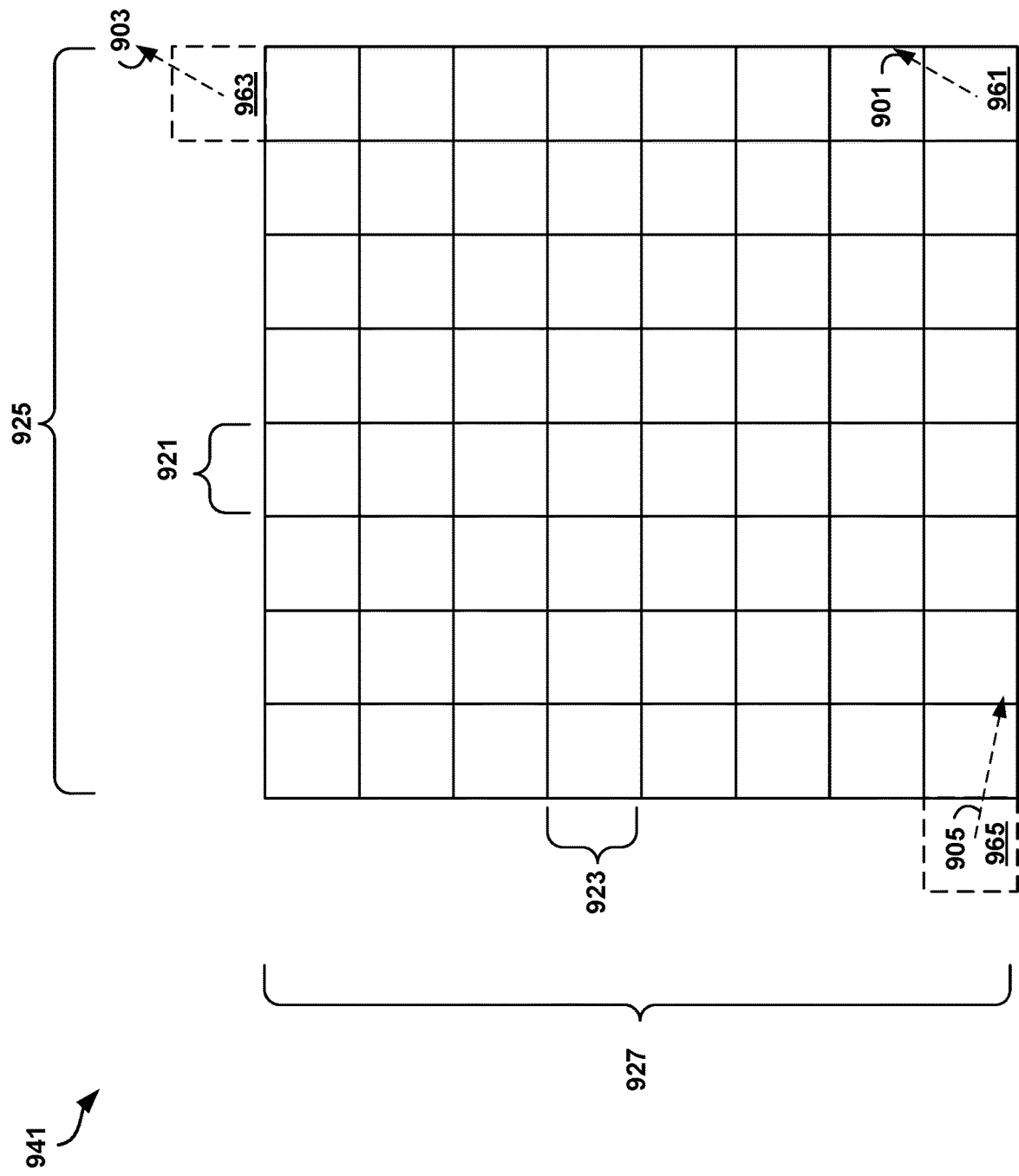
FIG. 9 shows a third example of subblock-based affine motion compensation using subblocks at an extended column and row of a current block of video data.

FIG. 9 shows a third example of subblock-based affine motion compensation using subblocks at an extended column and row of a current block 941 of video data. In the example of FIG. 9, the coordinates of CPMV are (cx+blkW−sbW/2, cy−sbH/2), (cx−sbW/2, cy+blkH−sbH/2) and (cx+blkW−sbW/2, cy+blkH−sbH/2), where blkW 925 is a width of a current block, blkH 927 is a height of the current block, sbH 923 is a height of subblocks 961-965, and sbW 921 is a width of subblocks 961-965. For instance, CPMV $\vec{v}_0$ 901 (referred to herein as simply "CPMV 901") is at coordinate (cx+blkW−sbW/2, cy−sbH/2) and associated with (e.g., assigned to) subblock 961 of current block 941. CPMV $\vec{v}_1$ 903 (referred to herein as simply "CPMV 903") is at coordinate (cx−sbW/2, cy+blkH−sbH/2) and associated with subblock 863 of an extended row. CPMV $\vec{v}_2$ 905 (referred to herein as simply "CPMV 905") is at coordinate (cx−sbW/2, cy+blkH−sbH/2) and associated with subblock 865 of an extended column. In the example of FIG. 9, CPMV 901 is at coordinates (x0, y0) for current block 941, CPMV 903 is at coordinates (x1, y1) for current block 941, and CPMV 905 is at coordinates (x2, y2) for current block 941.

Said differently, for example, a video coder (video encoder 200 or video decoder 300) may select a first subblock (e.g., subblock 961) associated with a first control-point motion vector (e.g., subblock MV 901) of the control-point motion vectors with coordinates at (cx+blkW−sbW/2, cy−sbH/2). In this example, (cx,cy) is a coordinate of the top-left pixel of current block 941). The video coder may select a second subblock (e.g., subblock 963) associated with a second control-point motion vector (e.g., subblock MV 903) of the control-point motion vectors with coordinates at (cx−sbW/2, cy+blkH−sbH/2). In this example, the video coder may select a third subblock (e.g., subblock 965) associated with a third control-point motion vector (e.g., subblock MV 905) of the control-point motion vectors with coordinates at (cx+blkW−sbW/2, cy+blkH−sbH/2). Therefore, x1−x0 and y2−y0 are blkW and blkH, respectively. That is, to generate an affine motion model, a video coder may be configured to calculate equation 11. The equation (5) becomes as follows:

$$\begin{cases} v_x = \frac{(v_{1x} - v_{0x})}{blkW} * (nSbC - j - 1) * sbW + \frac{(v_{2x} - v_{0x})}{blkH} * (nSbR - i - 1) * \\ v_y = \frac{(v_{1y} - v_{0y})}{blkW} * (nSbC - j - 1) * sbW + \frac{(v_{2y} - v_{0y})}{blkH} * (nSbR - i - 1) \end{cases} \quad 11)$$

Where nSbC=blkW/sbW is number of subblock in a column, and nSbR=blkH/sbH is number of subblock in a row.

Figure 10:
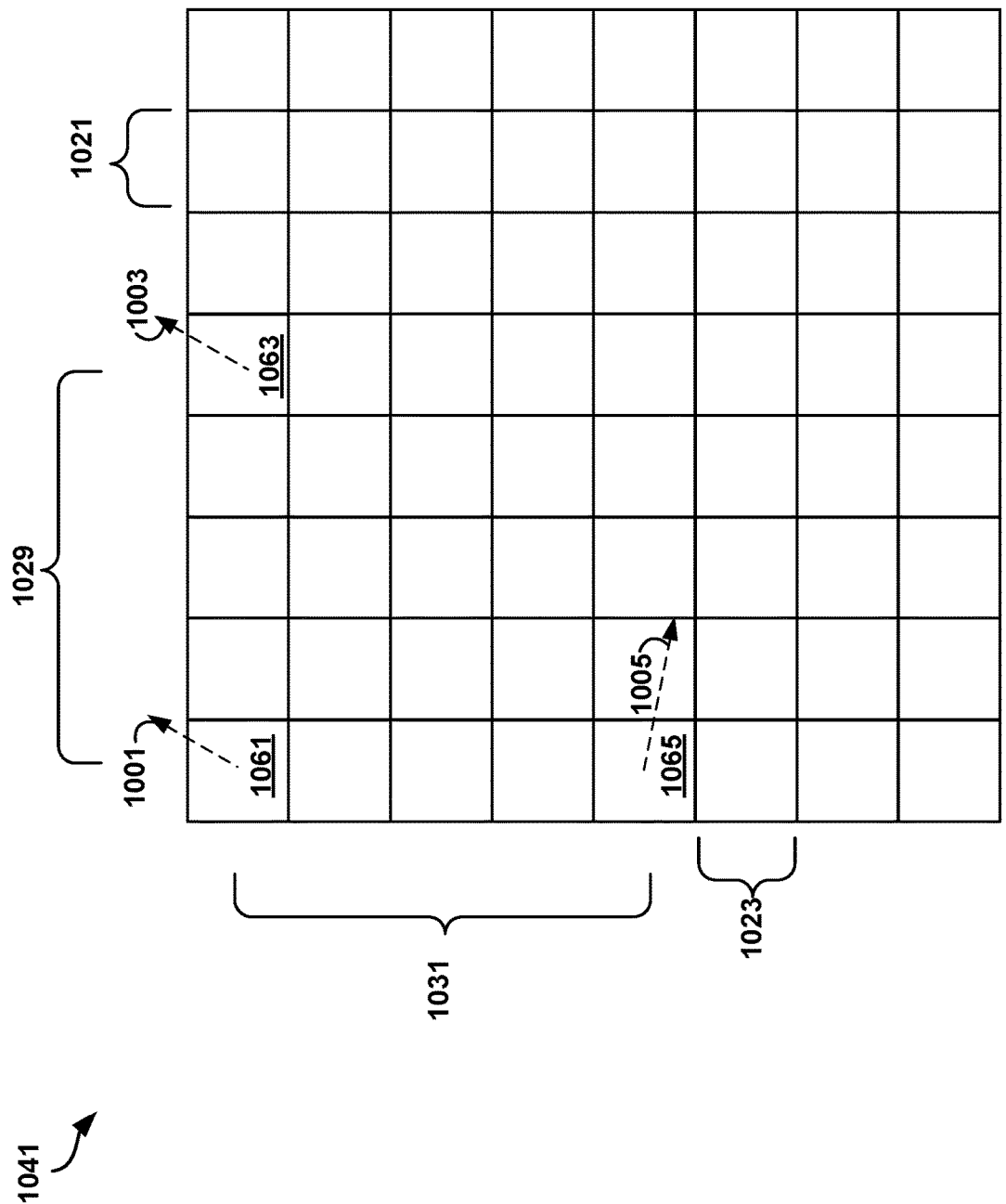
FIG. 10 shows an example of subblock-based affine motion compensation using subblocks within a current block of video data.

FIG. 10 shows an example of subblock-based affine motion compensation using subblocks within a current block 1041 of video data. In the example of FIG. 10, the coordinates of CPMVs are (cx+sbW/2, cy+sbH/2), (cx+blkW/2+sbW/2, cy+sbH/2) and (cx+sbW/2, cy+blkH/2+sbH/2), where blkW/2 1029 is half a width of current block 1041, blkH/2 1031 is half a height of current block 1041, sbH 1023 is a height of subblocks 1061-1065, and sbW 1021 is a width of subblocks 1061-1065. For instance, CPMV $\vec{v}_0$ 1001 is at coordinate (cx+sbW/2, cy+sbH/2) and associated with (e.g., assigned to) subblock 1061 of current block 1041. CPMV $\vec{v}_1$ 1003 is at coordinate (cx+blkW/2+sbW/2, cy+sbH/2) and associated with subblock 1063 of current block 1041. CPMV $\vec{v}_2$ 1005 is at coordinate (cx+sbW/2, cy+blkH/2+sbH/2) and associated with subblock 1065 of current block 1041.

Said differently, for example, a video coder (video encoder 200 or video decoder 300) may select a first subblock (e.g., subblock 1061) associated with a subblock motion vector (e.g., subblock MV 1001) with coordinates at (x0, y0) for current block 1041. In this example, the video coder may select a second subblock (e.g., subblock 1063) associated with a subblock motion vector (subblock MV 1003) with coordinates at (x1, y1) for current block 1041. In this example, x1–x0 is a half of a width of current block 1041. The video coder may select a third subblock (e.g., subblock 1065) associated with a subblock motion vector (e.g., subblock MV 1005) with coordinates at (x2, y2) for current block 1041. In this example, y2–y0 is a half of a height of current block 1041.

That is, a video coder may select a first subblock (e.g., subblock 1061) associated with a first control-point motion vector (e.g., subblock MV 1001) of the control-point motion vectors with coordinates at (cx+sbW/2, cy+sbH/2). In this example, (cx,cy) is a coordinate of the top-left pixel of current block 1041). The video coder may select a second subblock (e.g., subblock 1063) associated with a second control-point motion vector (e.g., subblock MV 1003) of the control-point motion vectors with coordinates at (cx+blkW/2+sbW/2, cy+sbH/2). In this example, the video coder may select a third subblock (e.g., subblock 1065) associated with a third control-point motion vector (e.g., subblock MV 1005) of the control-point motion vectors with coordinates at (cx+sbW/2, cy+blkH/2+sbH/2). Therefore, x1–x0 and y2–y0 are blkW/2 and blkH/2, respectively, which are also power of 2. That is, to generate an affine motion model, a video coder may be configured to calculate equation 12. The equation (5) becomes as follows:

$$\begin{cases} v_x = \frac{(v_{1x} - v_{0x})}{blkW/2} * j * sbW + \frac{(v_{2x} - v_{0x})}{blkH/2} * i * sbH + v_{0x} \\ v_y = \frac{(v_{1y} - v_{0y})}{blkW/2} * j * sbW + \frac{(v_{2y} - v_{0y})}{blkH/2} * i * sbH + v_{0y} \end{cases} \quad 12)$$

In some other examples, the coordinates of CPMV are set such that x1–x0 and y2–y0 are blkW/2 and blkH/2, respectively. In another example, the CPMV subblocks (e.g., subblocks 1061-1065) of all blocks in a coding tree unit (CTU) have the same coordinates. Let (ux, uy) be the coordinate of the top-left pixel of the CTU. In some examples, the coordinates of the selected CPMVs are (ux+sbW/2, uy+sbH/2), (ux+ctuW-sbW/2, uy+sbH/2) and (ux+sbW/2, uy+ctuH-sbH/2), wherein ctuW and ctuH are the width and height of the CTU respectively. In another example, the coordinates are (ux+sbW/2, uy+sbH/2), (ux+ctuW+sbW/2, uy+sbH/2) and (ux+sbW/2, uy+ctuH+sbH/2). In still another example, the coordinates are (ux-sbW/2, uy-sbH/2), (ux+ctuW-sbW/2, uy-sbH/2) and (ux-sbW/2, uy+ctuH-sbH/2).

In some examples, the inherited affine motion vector prediction uses the affine motion model of a neighboring coded block to derive the predicted CPMVs of current block. For example, a video coder may derive a predicted CPMV of a current block using an affine motion model for a neighboring block (e.g., affine merge mode). In this example, the inherited affine motion vector prediction assumes the current block shares the same affine motion model as the neighboring coded block. Let $\vec{v}_0=(v_{0x}, v_{0y})$, $\vec{v}_1=(v_{1x}, v_{1y})$, $\vec{v}_2=(v_{2x}, v_{2y})$, and (x0, y0), (x1, y1) and (x2, y2) be the corresponding coordinates. The predicted CPMVs of current block $\vec{v}'_0=(v_{0x}', v_{0y}')$, $\vec{v}'_0=(v_{1x}', v_{1y}')$, and $\vec{v}'_2=(v_{2x}', v_{2y}')$ can be derived as follows.

$$\begin{cases} v'_{0x} = \frac{(v_{1x} - v_{0x})}{x1 - x0}(x0' - x0) + \frac{(v_{2x} - v_{0x})}{y2 - y0}(y0' - y0) + v_{0x} \\ v'_{0y} = \frac{(v_{1y} - v_{0y})}{x1 - x0}(x0' - x0) + \frac{(v_{2y} - v_{0y})}{y2 - y0}(y0' - y0) + v_{0y} \end{cases} \quad 13)$$

$$\begin{cases} v'_{1x} = \frac{(v_{1x} - v_{0x})}{x1 - x0}(x1' - x0) + \frac{(v_{2x} - v_{0x})}{y2 - y0}(y1' - y0) + v_{0x} \\ v'_{1y} = \frac{(v_{1y} - v_{0y})}{x1 - x0}(x1' - x0) + \frac{(v_{2y} - v_{0y})}{y2 - y0}(y1' - y0) + v_{0y} \end{cases} \quad 14)$$

$$\begin{cases} v'_{2x} = \frac{(v_{1x} - v_{0x})}{x1 - x0}(x2' - x0) + \frac{(v_{2x} - v_{0x})}{y2 - y0}(y2' - y0) + v_{0x} \\ v'_{2y} = \frac{(v_{1y} - v_{0y})}{x1 - x0}(x2' - x0) + \frac{(v_{2y} - v_{0y})}{y2 - y0}(y2' - y0) + v_{0y} \end{cases} \quad 15)$$

Where (x0', y0'), (x1', y1') and (x2', y2') are the coordinates of the predicted CPMVs.

In the affine merge mode, a video coder (video encoder 200 or video decoder 300) may first derive the CPMVs as described above, then derive the subblock MVs for motion compensation from the CPMVs. The video coder may apply a rounding process to both steps, which may increase the prediction error. In some examples, a video coder (video encoder 200 or video decoder 300) may be configured to directly predict the subblock MV from the CPMVs of the neighboring coded block. The subblock MV ($v_x$, $v_y$) at coordinate (x,y) is derived as follows.

$$\begin{cases} v_x = \frac{(v_{1x} - v_{0x})}{x1 - x0}(x - x0) + \frac{(v_{2x} - v_{0x})}{y2 - y0}(y - y0) + v_{0x} \\ v_y = \frac{(v_{1y} - v_{0y})}{x1 - x0}(x - x0) + \frac{(v_{2y} - v_{0y})}{y2 - y0}(y - y0) + v_{0y} \end{cases} \quad 16)$$

Note that the division operations in the above can be replaced by LUT method or simply right shifting, depending on the selection of CPMV subblocks. In the examples of FIG. 7 and FIG. 8, some of the CPMVs that are located at the extended column and/or row (denoted as dashed subblocks) are not available for inherited affine motion prediction. However, the selected subblock MVs for inherited affine motion prediction are not necessarily the same as the CPMVs that are used for coding the neighboring block. To simply use the right shifting operation for the division, a video coder (video encoder 200 or video decoder 300) may be configured to select the CPMVs for inherited affine motion prediction from the subblock MVs in the neighboring block such that x1−x0 is nW/2 and y2−y0 is nH/2, nW and nH are the width and height of the neighboring block, respectively (which are typically both power of 2).

In the case that the CPMV subblocks of all blocks in a coding tree unit (CTU) have the same coordinates, a video coder may directly use the CPMVs of neighboring coded block as the predicted CPMVs for the current block in the inherited affine motion prediction, i.e. $\vec{v}'_0 = \vec{v}_0$, $\vec{v}'_1 = \vec{v}_1$, $\vec{v}'_2 = \vec{v}_2$.

Figure 11:
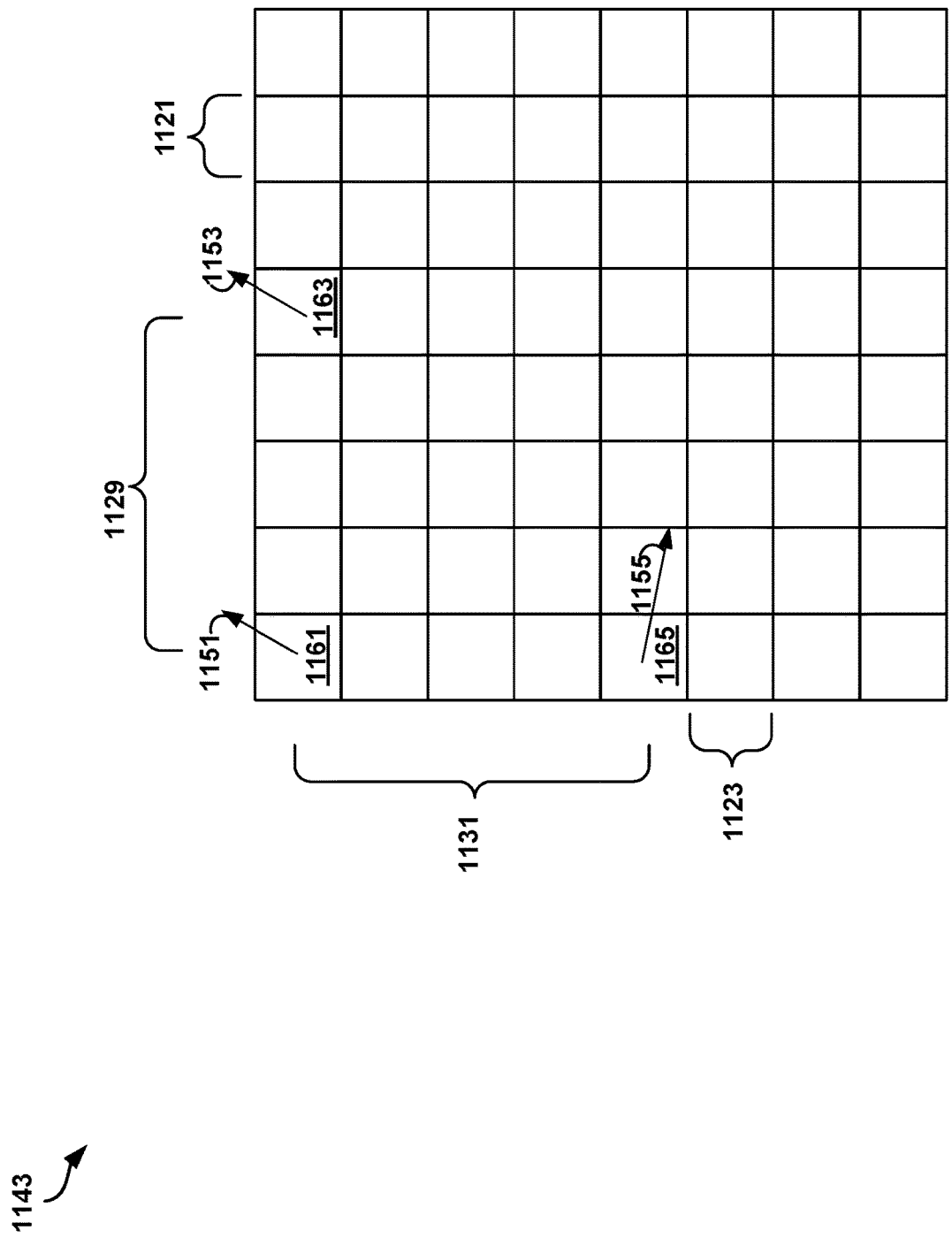
FIG. 11 shows an example of subblock-based affine motion compensation using motion vectors of top-left, top-middle, and left-middle subblocks of a neighboring block.

FIG. 11 shows an example of subblock-based affine motion compensation using motion vectors of top-left, top-middle, and left-middle subblocks of a neighboring block 1143. While the examples of FIGS. 3-10 are directed to selecting CPMV subblocks for a current block, the example of FIG. 11 is directed to selecting subblock MVs from a neighboring block to determine the CPMVs for a current block. As mentioned above, the selected subblock MVs of the neighboring block for inherited affine motion prediction are not necessary the same as the CPMVs that are used for coding the neighboring block. In this way, a video coder (e.g., video encoder 200 or video decoder 300) may be configured to select the subblock MVs of neighboring block 1143 such that the divisions in equation (12) can be replaced by right shifting.

In the example of FIG. 11, a video coder (video encoder 200 or video decoder 300) may use the top-left, top-middle and left-middle subblock MVs of the neighboring block, the coordinates are (nx+sbW/2, ny+sbH/2), (nx+nW/2+sbW/2, ny+sbH/2) and (nx+sbW/2, ny+nH/2+sbH/2), where sbH 1123 is a height of subblocks 1161-1165, and sbW 1121 is a width of subblocks 1161-1165, (nx, ny) is the coordinate of the top-left pixel of neighboring block 1143, Nh/2 1131 is half a height of neighboring block 1143 and Nw/2 1129 is half a width of neighboring block 1143.

For instance, MV $\vec{v}_0$ 1151 (referred to herein as simply "MV 1151") is at coordinate (nx+sbW/2, ny+sbH/2) and associated with (e.g., assigned to) subblock 1161 of neighboring block 1143. MV $\vec{v}_1$ 1153 (referred to herein as simply "MV 1153") is at coordinate (nx+nW/2+sbW/2, ny+sbH/2) and associated with subblock 1163 of neighboring block 1143. MV $\vec{v}_2$ 1155 (referred to herein as simply "MV 1155") is at coordinate (nx+sbW/2, ny+nH/2+sbH/2) and associated with subblock 1165 of neighboring block 1143. In the example of FIG. 11, MV 1161 is at coordinates (x0, y0) for neighboring block 11143, MV 1163 is at coordinates (x1, y1), for neighboring block 11143 and MV 1165 is at coordinates (x2, y2) for neighboring block 11143. Therefore, x1−x0 is equal to a width of neighboring block 1143 (blkW) and y2−y0 is equal to a height of neighboring block 1143 (blkH). Said differently, a video coder may be configured to select MVs 1151-1155 of neighboring block 1143 for inherited affine motion prediction of a current block.

Figure 12:
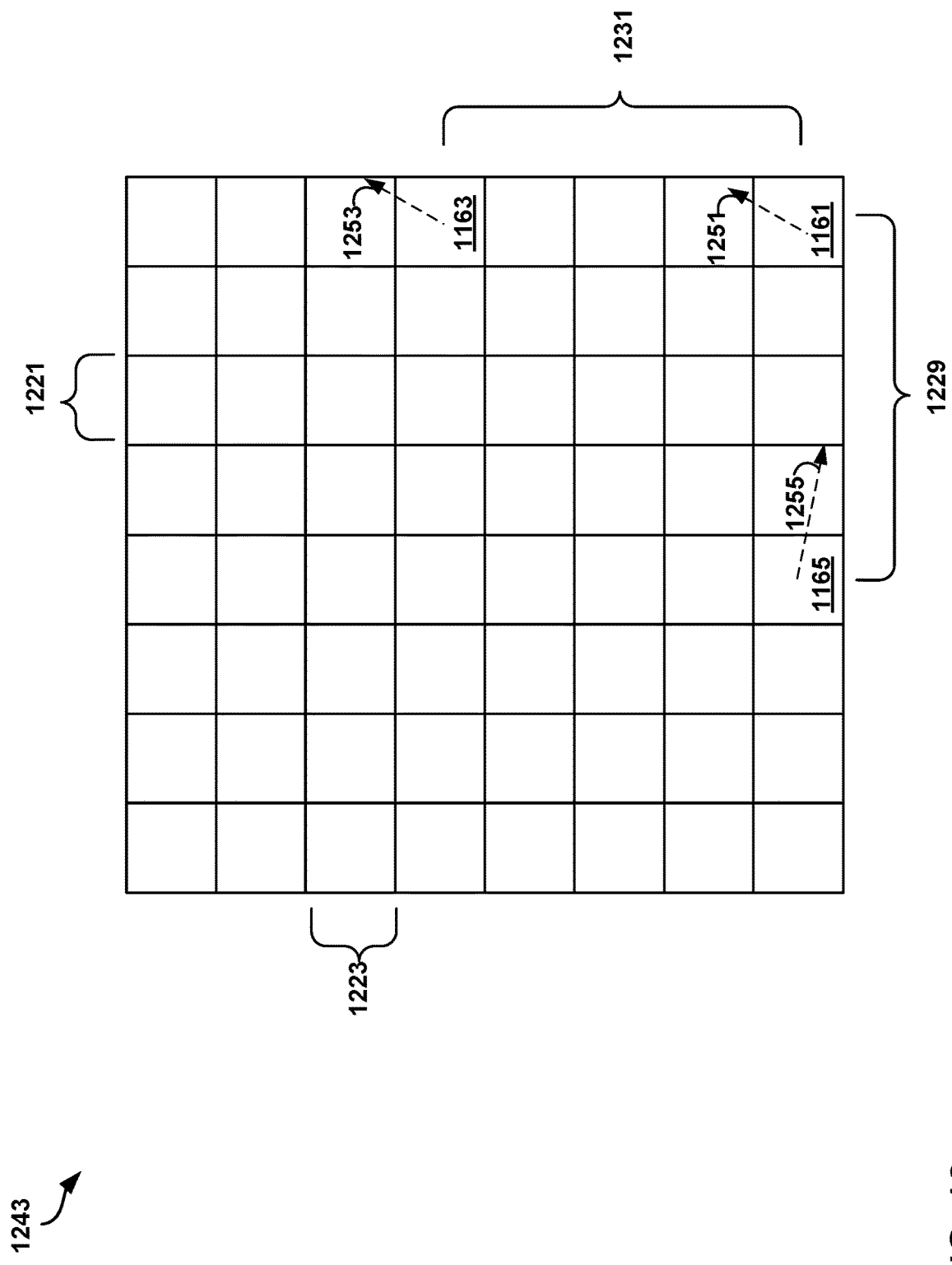
FIG. 12 shows an example of subblock-based affine motion compensation using motion vectors of bottom-right, bottom-middle, and right-middle subblocks of a neighboring block.

FIG. 12 shows an example of subblock-based affine motion compensation using motion vectors of bottom-right subblock 1261 of a neighboring block 1243, a bottom-middle subblock 1265 of a neighboring block 1243, and right-middle subblock 1263 of a neighboring block 1243.

As shown in FIG. 12, MV $\vec{v}_0$ 1251 (referred to herein as simply "MV 1251") is associated with (e.g., assigned to) bottom-right subblock 1261. MV $\vec{v}_1$ 1253 (referred to herein as simply "MV 1253") is associated with right-middle subblock 1263. MV $\vec{v}_2$ 1255 (referred to herein as simply "MV 1255") is assigned to bottom-middle subblock 1265. In this example, MVs 1251-1253 are at the coordinates are (nx+nW-sbW/2, ny+nH-sbH/2), (nx+nW/2-sbW/2, ny+nH-sbH/2) and (nx+nW-sbW/2, ny+nH/2-sbH/2), respectively, where sbH 1223 is a height of subblocks 1261-1265, sbW 1221 is a width of subblocks 1261-1265, and (nx, ny) is the coordinate of the top-left pixel of neighboring block 1243, Nh/2 1131 is half a height of neighboring block 1243, and Nw/2 1129 is half a width of neighboring block 1243. For instance, MV $\vec{v}_0$ 1251 (referred to herein as simply "MV 1251") is at coordinate (nx+nW-sbW/2, ny+nH-sbH/2), MV $\vec{v}_1$ 1253 (referred to herein as simply "MV 1253") is at coordinate (nx+nW/2-sbW/2, ny+nH-sbH/2), and MV $\vec{v}_2$ 1255 (referred to herein as simply "MV 1255") is at coordinate (nx+nW-sbW/2, ny+nH/2-sbH/2). Said differently, a video coder (video encoder 200 or video decoder 300) may be configured to select MVs 1251-1255 of neighboring block 1243 for inherited affine motion prediction of a current block.

In some examples, if the neighboring block is in current CTU, then the process illustrated in FIG. 11 may be adopted; if the neighboring block is in the left CTU, then the process illustrated in FIG. 12 may be adopted. For example, a video coder (e.g., video encoder 200 or video decoder 300) may be configured to select MVs 1151-1155 in response to determining that neighboring block 1143 is in a current CTU. In this example, the video coder may refrain from selecting MVs 1151-1155 in response to determining that neighboring block 1143 is not in a current CTU. In some examples, the video coder may be configured to select MVs 1251-1255 in response to determining that neighboring block 1143 is in left CTU. In this example, the video coder may be configured to refrain from select MVs 1251-1255 in response to determining that neighboring block 1143 is not in left CTU.

If the neighboring coded block locates at the above coding tree unit (CTU) row, a video coder may select two subblock MVs that are stored in the line buffer as the CPMVs for inherited affine motion prediction, and the horizontal coordinate difference is nW/2. To reduce the line buffer requirement, 4-parameter affine motion compensation model is assumed if the neighboring coded block locates at the above CTU row. That is, a video coder may apply a 4-parameter affine motion compensation model in response to determining the neighboring coded block locates at the above CTU row from a current block.

In some examples, a video coder may use the bottom-right and bottom-middle of the subblock MVs, the coordinates of the two subblocks are (nx+nW-sbW/2, ny+nH-sbH/2) and (nx+nW/2-sbW/2, ny+nH-sbH/2). In some examples, a video coder may use the bottom-left and bottom-middle of the subblock MVs, the coordinates of the two subblocks are (nx+sbW/2, ny+nH-sbH/2) and (nx+nW/2+sbW/2, ny+nH-sbH/2).

Note that in the above examples, the center position of the subblock is used as the coordinates of the subblock. However, a video coder may use other positions of the subblock. For example, the top-left pixel of the subblock, then the coordinates described above can be changed by removing the terms of sbW/2 and sbH/2.

Figure 13:
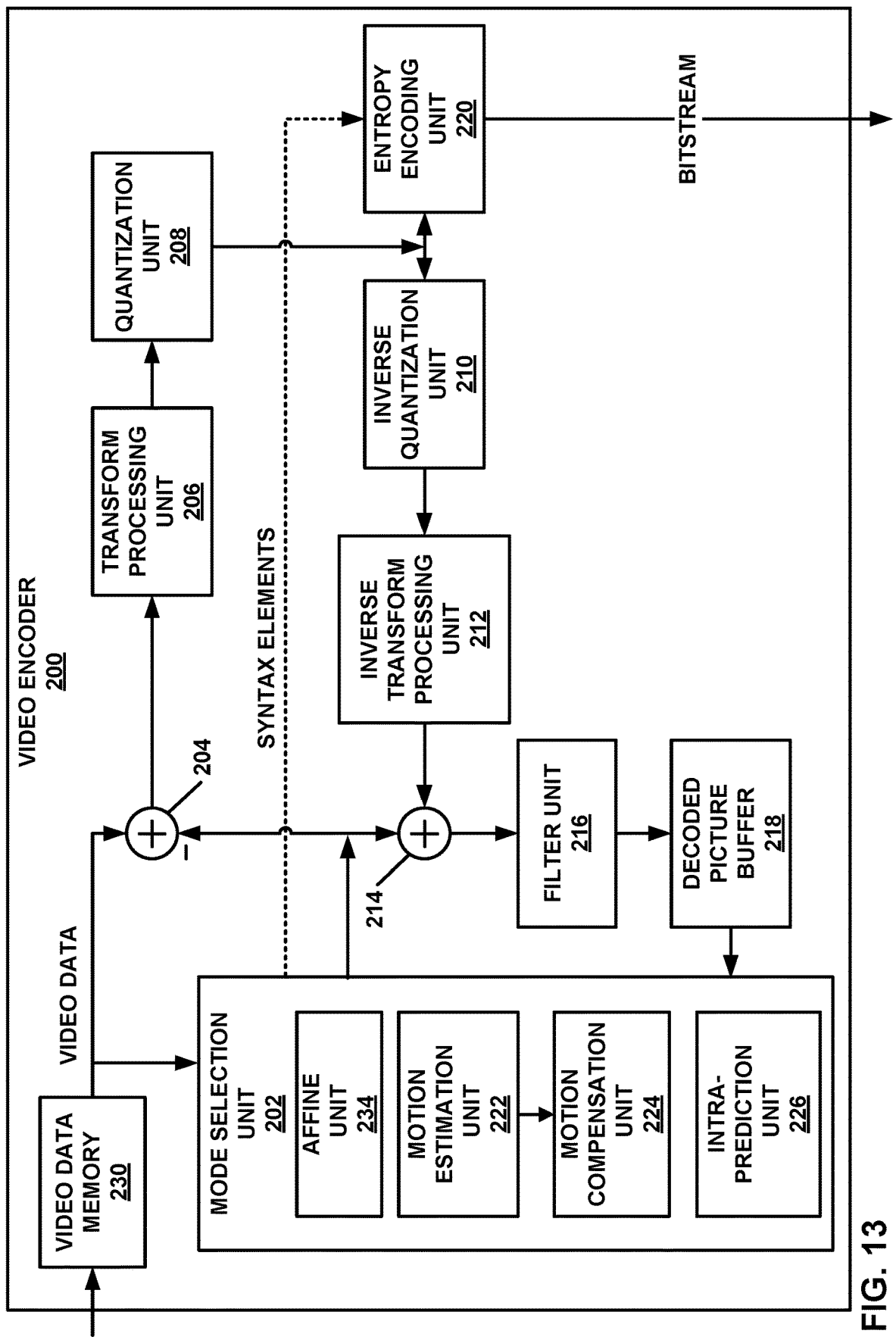
FIG. 13 is a block diagram illustrating an example video encoder that may perform the techniques of this disclosure.

FIG. 13 is a block diagram illustrating an example video encoder 200 that may perform the techniques of this disclosure. FIG. 13 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 13, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random-access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 13 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit 234, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, affine unit 334, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that define the positions of the reference blocks in the reference pictures relative to the position of the current block in a current picture. Affine unit 234 may select two or more subblocks of one or more blocks of video data and generate an affine motion model for a current block of video data using a subblock motion vector from each of the two or more subblocks as control-point motion vectors for the current block. Motion estimation unit 222 may then provide the motion vectors to motion compensation unit 224. In some examples, motion estimation unit 222 may determine one or more prediction blocks based on the affine motion model and predict the current block with the one or more prediction blocks.

For uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. Motion compensation unit 224 may determine, using affine motion compensation, a prediction block for a current block using the motion vector and using subblock motion vectors as control-point motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 120 may support CU sizes of 2N×2N, 2N×N, or N×2N.

For other video coding techniques such as an intra-block copy mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a MV and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Video encoder 200 represents an example of a video decoding device including a memory configured to store video data, and one or more processing units implemented in circuitry and configured to select two or more subblocks of one or more blocks of video data. In this example, video encoder 200 may generate an affine motion model for a current block of video data using a subblock motion vector from each of the two or more subblocks as control-point motion vectors for the current block. Video encoder 200 may determine one or more prediction blocks based on the affine motion model and predict the current block with the one or more prediction blocks.

Figure 14:
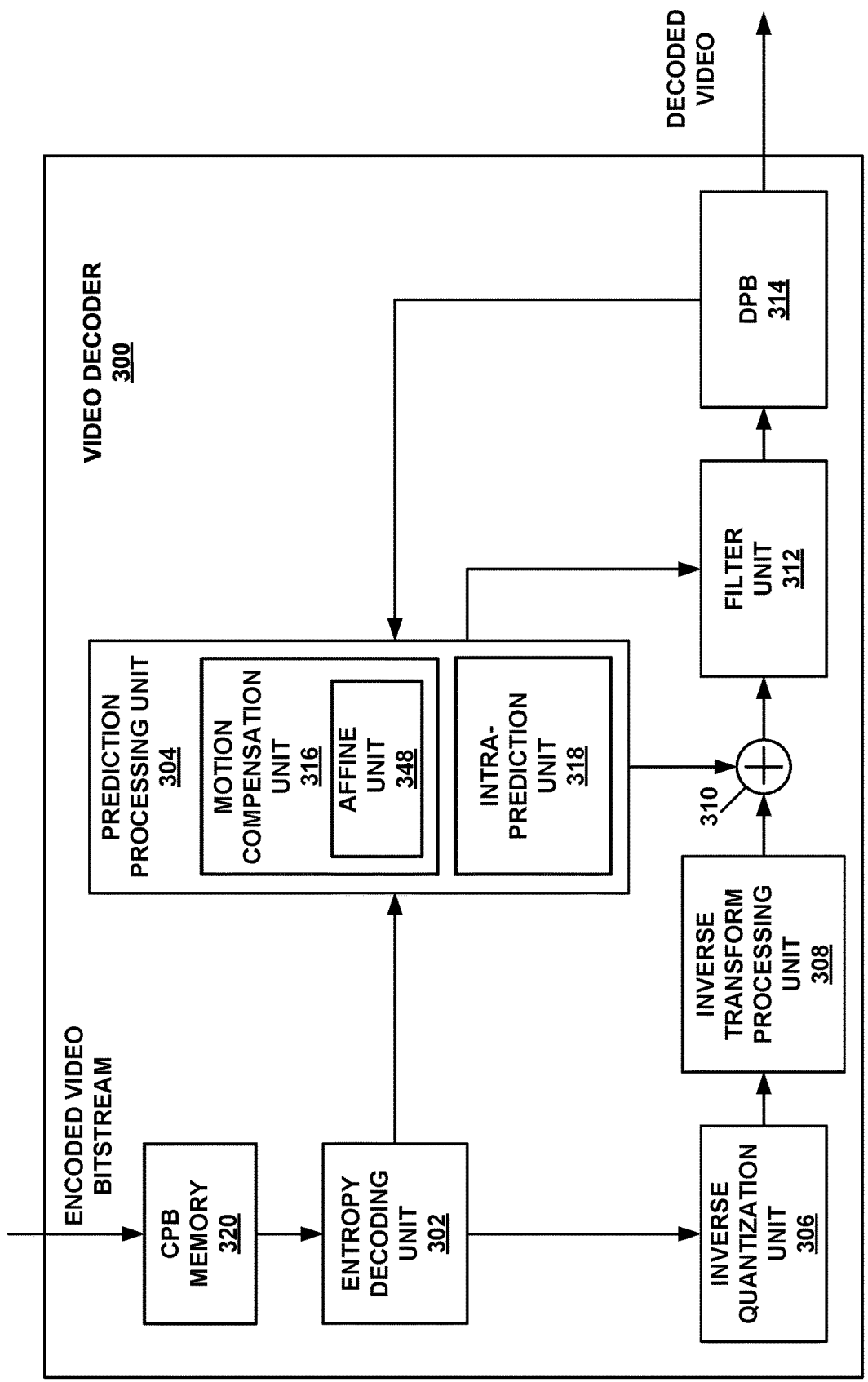
FIG. 14 is a block diagram illustrating an example video decoder that may perform the techniques of this disclosure.

FIG. 14 is a block diagram illustrating an example video decoder 300 that may perform the techniques of this disclosure. FIG. 14 is provided for purposes of explanation and is not limiting on the techniques as broadly exemplified and described in this disclosure. For purposes of explanation, this disclosure describes video decoder 300 is described according to the techniques of JEM and HEVC. However, the techniques of this disclosure may be performed by video coding devices that are configured to other video coding standards.

In the example of FIG. 14, video decoder 300 includes coded picture buffer (CPB) memory 320, entropy decoding unit 302, prediction processing unit 304, inverse quantization unit 306, inverse transform processing unit 308, reconstruction unit 310, filter unit 312, and DPB 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), affine unit 348, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random-access memory (DRAM), including synchronous DRAM (SDRAM), magnetoresistive RAM (MRAM), resistive RAM (RRA \4), or other types of memory devices. CPB memory 320 and DPB 314 may be provided by the same memory device or separate memory devices. In various examples, CPB memory 320 may be on-chip with other components of video decoder 300, or off-chip relative to those components.

Additionally, or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 14 are illustrated to assist with understanding the operations performed by video decoder 300. The units may be implemented as fixed-function circuits, programmable circuits, or a combination thereof. Similar to FIG. 13, fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. For example, affine unit 348 may select two or more subblocks of one or more blocks of video data and generate an affine motion model for a current block of video data using a subblock motion vector from each of the two or more subblocks as control-point motion vectors for the current block. Motion compensation unit 316 may determine one or more prediction blocks based on the affine motion model and predict the current block with the one or more prediction blocks. The prediction information syntax elements may indicate a reference picture in DPB 314 from which to retrieve a reference block, as well as a motion vector identifying a location of the reference block in the reference picture relative to the location of the current block in the current picture. Motion compensation unit 316 may determine, using affine motion compensation, a prediction block for a current block using the motion vector and using subblock motion vectors as control-point motion vectors. Motion compensation unit 316 may generally perform the inter-prediction process in a manner that is substantially similar to that described with respect to motion compensation unit 224 (FIG. 13).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 13). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, video decoder 300 represents an example of a video decoding device including a memory configured to store video data, and one or more processing units implemented in circuitry and configured to select two or more subblocks of one or more blocks of video data. In this example, video decoder 300 may generate an affine motion model for a current block of video data using a subblock motion vector from each of the two or more subblocks as control-point motion vectors for the current block. Video decoder 300 may determine one or more prediction blocks based on the affine motion model and predict the current block with the one or more prediction blocks.

Figure 15:
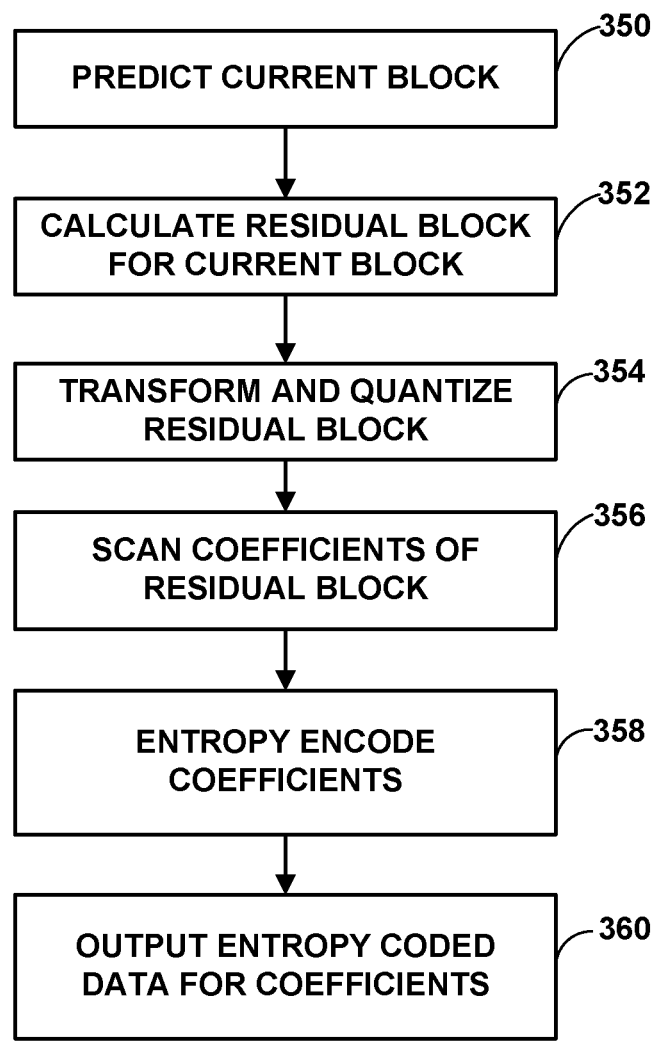
FIG. 15 is a flowchart illustrating a video encoding process.

FIG. 15 is a flowchart illustrating an example method for encoding a current block. The current block may comprise a current CU. Although described with respect to video encoder 200 (FIGS. 1 and 2), it should be understood that other devices may be configured to perform a method similar to that of FIG. 15.

In this example, video encoder 200 initially predict the current block (350). For example, video encoder 200 may form a prediction block for the current block. For example, video encoder 200 may select two or more subblocks of one or more blocks of video data and generate an affine motion model for a current block of video data using a subblock motion vector from each of the two or more subblocks as control-point motion vectors for the current block. In this example, video encoder 200 may determine one or more prediction blocks based on the affine motion model and predict the current block with the one or more prediction blocks. Video encoder 200 may then calculate a residual block for the current block (352). To calculate the residual block, video encoder 200 may calculate a difference between the original, uncoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC. Video encoder 200 may then output the entropy coded data of the block (360).

Figure 16:
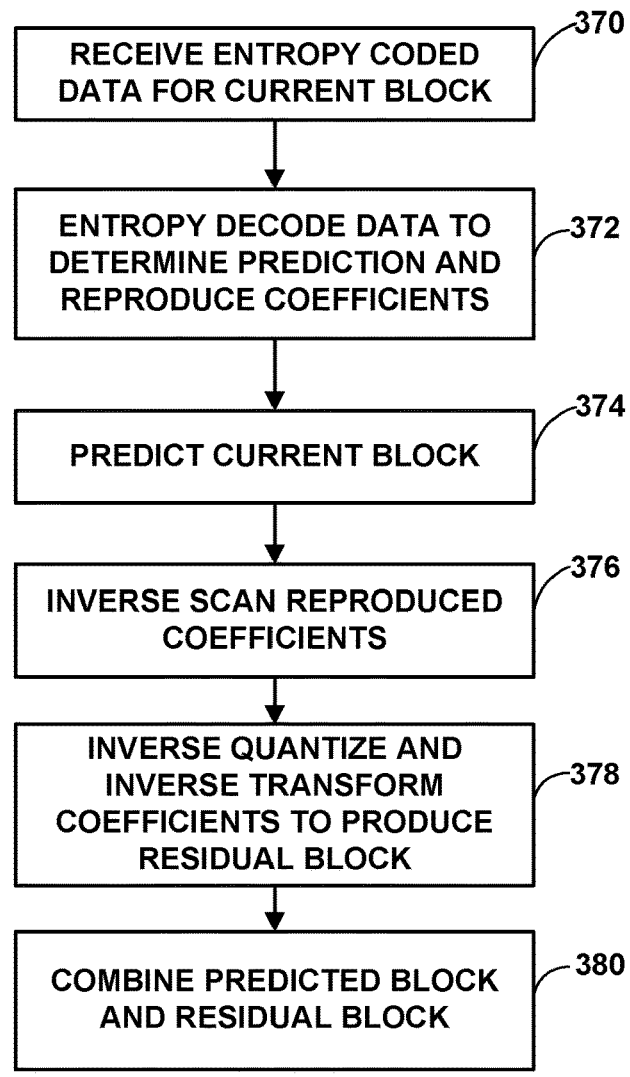
FIG. 16 is a flowchart illustrating a video decoding process.

FIG. 16 is a flowchart illustrating an example method for decoding a current block of video data. The current block may comprise a current CU. Although described with respect to video decoder 300 (FIGS. 1 and 3), it should be understood that other devices may be configured to perform a method similar to that of FIG. 16.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. For example, video decoder 300 may select two or more subblocks of one or more blocks of video data and generate an affine motion model for a current block of video data using a subblock motion vector from each of the two or more subblocks as control-point motion vectors for the current block. In this example, video decoder 300 may determine one or more prediction blocks based on the affine motion model and predict the current block with the one or more prediction blocks to generate a predicted block. Video decoder 300 may then inverse scan the reproduced coefficients (376), to create a block of quantized transform coefficients. Video decoder 300 may then inverse quantize and inverse transform the coefficients to produce a residual block (378). Video decoder 300 may ultimately decode the current block by combining the prediction block and the residual block (380).

Figure 17:
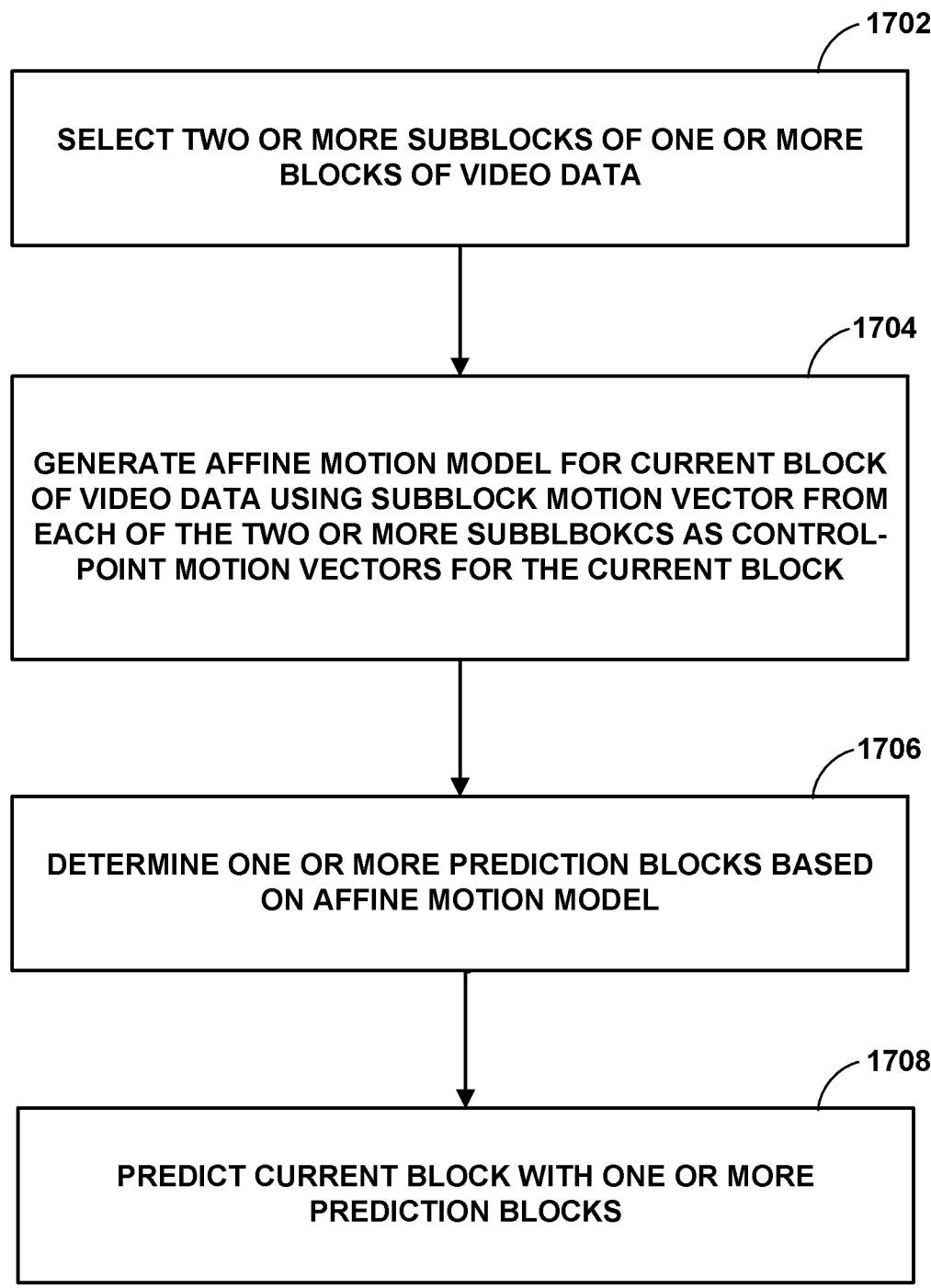
FIG. 17 is a flowchart illustrating a process for generating one or more prediction blocks using subblock motion vectors as CPMVs.

FIG. 17 is a flowchart illustrating a process for generating one or more prediction blocks. Although described with respect to video decoder 300 (FIGS. 1 and 3), it should be understood that other devices may be configured to perform a method similar to that of FIG. 17.

A video coder (e.g., video encoder 200 or video decoder 300) may select two or more subblocks of one or more blocks of video data (1702). For example, the video coder may select subblocks 661-665 of FIG. 6, subblocks 761-765 of FIG. 7, subblocks 861-865 of FIG. 8, subblocks 961-965 of FIG. 9, or subblocks 1061-1065 of FIG. 10. The video coder may generate an affine motion model for a current block of the video data using a subblock motion vector from each of the two or more subblocks as control-point motion vectors for the current block (1704). For example, the video coder may generate an affine motion model for current block 641 using CPMVs 601-605. For instance, video coder may calculate equation 7 or 8 using CPMVs 601-605. In some examples, the video coder may generate an affine motion model for current block 741 using CPMVs 701-705. For instance, video coder may calculate equation 9 using CPMVs 701-705. The video coder may generate an affine motion model for current block 841 using CPMVs 801-805. For instance, video coder may calculate equation 10 using CPMVs 801-805. In some examples, the video coder may generate an affine motion model for current block 941 using CPMVs 901-905. For instance, video coder may calculate equation 11 using CPMVs 901-905. The video coder may generate an affine motion model for current block 1041 using CPMVs 1001-1005. For instance, video coder may calculate equation 12 using CPMVs 1001-1005. The video coder may determine one or more prediction blocks based on the affine motion model (1706) and predict the current block with the one or more prediction blocks (1708).

Illustrative examples of the disclosure include:

Example 1

A method of processing video data, the method comprising: determining a motion vector for a current block of the video data; determining subblock motion vectors; and using affine motion compensation, determining a prediction block for a current block using the motion vector and the subblock motion vectors as control-point motion vectors.

Example 2

The method of example 1, comprising: selecting three subblock motion vectors as the control-point motion vectors.

Example 3

The method of example 1, comprising: selecting two subblock motion vectors as the control-point motion vectors.

Example 4

The method of any combination of examples 1-3, comprising:

generating an affine motion model by calculating:

$$\begin{cases} v_x = ((v_{1x} - v_{0x}) * x * LUT[x1 - x0] + (v_{2x} - v_{0x}) * y * LUT[y2 - y0] + \\ \quad (v_{0x} \ll LUT\_PRECISION)) \gg LUT\_PRECISION \\ v_y = ((v_{1y} - v_{0y}) * x * LUT[x1 - x0] + (v_{2y} - v_{0y}) * y * LUT[y2 - y0] + \\ \quad (v_{0y} + LUT\_PRECISION)) \gg LUT\_PRECISION \end{cases}$$

wherein $(v_x, v_y)$ is the motion vector at the coordinate (x, y), wherein the affine motion model is be described by the three motion vectors $\vec{v}_0=(v_{0x}, v_{0y})$, $\vec{v}_1=(v_{1x}, v_{1y})$, and $\vec{v}_2=(v_{2x}, v_{2y})$, wherein the coordinates of the control-point motion vectors ($\vec{v}_0$, $\vec{v}_1$, and $\vec{v}_2$) are (x0, y0), (x1, y1) and (x2, y2), respectively.

Example 5

The method of any combination of examples 1-3, comprising:
generating an affine motion model by calculating:

$$\begin{cases} v_x = ((v_{1x} - v_{0x}) * x * LUT[x1 - x0]) \gg LUT_{PRECISION} + \\ ((v_{2x} - v_{0x}) * y * LUT[y2 - y0]) \gg LUT\_PRECISION + v_{0x} \\ v_y = ((v_{1y} - v_{0y}) * x * LUT[x1 - x0]) \gg LUT_{PRECISION} + \\ ((v_{2y} - v_{0y}) * y * LUT[y2 - y0]) \gg LUT\_PRECISION + v_{0y} \end{cases}$$

wherein $(v_x, v_y)$ is the motion vector at the coordinate (x, y), wherein the affine motion model is be described by the three motion vectors $\vec{v}_0=(v_{0x}, v_{0y})$, $\vec{v}_1=(v_{1x}, v_{1y})$, and $\vec{v}_2=(v_{2x}, v_{2y})$, wherein the coordinates of the control-point motion vectors ($\vec{v}_0$, $\vec{v}_1$, and $\vec{v}_2$) are (x0, y0), (x1, y1) and (x2, y2), respectively.

Example 6

The method of any combination of examples 1-3, comprising:
generating an affine motion model by calculating:

$$\begin{cases} v_x = \frac{(v_{1x} - v_{0x})}{blkW} * j * sbW + \frac{(v_{2x} - v_{0x})}{blkH} * i * sbH + v_{0x} \\ v_y = \frac{(v_{1y} - v_{0y})}{blkW} * j * sbW + \frac{(v_{2y} - v_{0y})}{blkH} * i * sbH + v_{0y} \end{cases}$$

wherein $(v_x, v_y)$ is the motion vector at the coordinate (x, y), wherein the affine motion model is be described by the three motion vectors $\vec{v}_0=(v_{0x}, v_{0y})$, $\vec{v}_1=(v_{1x}, v_{1y})$, and $\vec{v}_2=(v_{2x}, v_{2y})$, wherein the coordinates of the control-point motion vectors ($\vec{v}_0$, $\vec{v}_1$ and $\vec{v}_2$) are (x0, y0), (x1, y1) and (x2, y2), respectively, wherein blkW is width of a block and blkH is a height of the block, wherein sbH is a height of a subblock and sbW is a width of the subblock.

Example 7

The method of any combination of examples 1-3, comprising:

generating an affine motion model by calculating:

$$\begin{cases} v_x = \frac{(v_{1x} - v_{0x})}{blkW} * (j+1) * sbW + \frac{(v_{2x} - v_{0x})}{blkH} * (i+1) * sbH + v_{0x} \\ v_y = \frac{(v_{1y} - v_{0y})}{blkW} * (j+1) * sbW + \frac{(v_{2y} - v_{0y})}{blkH} * (i+1) * sbH + v_{0y} \end{cases}$$

wherein $(v_x, v_y)$ is the motion vector at the coordinate (x, y), wherein the affine motion model is be described by the three motion vectors $\vec{v}_0=(v_{0x}, v_{0y})$, $\vec{v}_1=(v_{1x}, v_{1y})$, and $\vec{v}_2=(v_{2x}, v_{2y})$, wherein the coordinates of the control-point motion vectors ($\vec{v}_0$, $\vec{v}_1$ and $\vec{v}_2$) are (x0, y0), (x1, y1) and (x2, y2), respectively, wherein blkW is width of a block and blkH is a height of the block, wherein sbH is a height of a subblock and sbW is a width of the subblock.

Example 8

The method of any combination of examples 1-3, comprising:
generating an affine motion model by calculating:

$$\begin{cases} v_x = \frac{(v_{1x} - v_{0x})}{blkW} * (nSbC - j - 1) * sbW + \frac{(v_{2x} - v_{0x})}{blkH} * \\ \quad (nSbR - i - 1) * sbH + v_{0x} \\ v_y = \frac{(v_{1y} - v_{0y})}{blkW} * (nSbC - j - 1) * sbW + \frac{(v_{2y} - v_{0y})}{blkH} * \\ \quad (nSbR - i - 1) * sbH + v_{0y} \end{cases}$$

wherein $(v_x, v_y)$ is the motion vector at the coordinate (x, y), wherein the affine motion model is be described by the three motion vectors $\vec{v}_0=(v_{0x}, v_{0y})$, $\vec{v}_1=(v_{1x}, v_{1y})$, and $\vec{v}_2=(v_{2x}, v_{2y})$, wherein the coordinates of the control-point motion vectors ($\vec{v}_0$, $\vec{v}_1$, and $\vec{v}_2$) are (x0, y0), (x1, y1) and (x2, y2), respectively, wherein blkW is width of a block and blkH is a height of the block, wherein sbH is a height of a subblock and sbW is a width of the subblock, wherein nSbC is a number of subblocks in a column, nSbR is a number of subblocks in a row.

Example 9

The method of any combination of examples 1-3, comprising:
generating an affine motion model by calculating:

$$\begin{cases} v_x = \frac{(v_{1x} - v_{0x})}{blkW/2} * j * sbW + \frac{(v_{2x} - v_{0x})}{blkH/2} * i * sbH + v_{0x} \\ v_y = \frac{(v_{1y} - v_{0y})}{blkW/2} * j * sbW + \frac{(v_{2y} - v_{0y})}{blkH/2} * i * sbH + v_{0y} \end{cases}$$

wherein $(v_x, v_y)$ is the motion vector at the coordinate (x, y), wherein the affine motion model is be described by the three motion vectors $\vec{v}_0=(v_{0x}, v_{0y})$, $\vec{v}_1=(v_{1x}, v_{1y})$, and $\vec{v}_2=(v_{2x}, v_{2y})$, wherein the coordinates of the control-point motion vectors ($\vec{v}_0$, $\vec{v}_1$, and $\vec{v}_2$) are (x0, y0), (x1, y1) and (x2, y2), respectively, wherein blkW is width of a block and blkH is a height of the block, wherein sbH is a height of a subblock and sbW is a width of the subblock.

Example 10

The method of any combination of examples 1-3, comprising:

predicting the control-point motion vectors for a current block by calculating:

$$\begin{cases} v'_{0x} = \frac{(v_{1x} - v_{0x})}{x1 - x0}(x0' - x0) + \frac{(v_{2x} - v_{0x})}{y2 - y0}(y0' - y0) + v_{0x} \\ v'_{0y} = \frac{(v_{1y} - v_{0y})}{x1 - x0}(x0' - x0) + \frac{(v_{2y} - v_{0y})}{y2 - y0}(y0' - y0) + v_{0y} \end{cases}$$

$$\begin{cases} v'_{1x} = \frac{(v_{1x} - v_{0x})}{x1 - x0}(x1' - x0) + \frac{(v_{2x} - v_{0x})}{y2 - y0}(y1' - y0) + v_{0x} \\ v'_{1y} = \frac{(v_{1y} - v_{0y})}{x1 - x0}(x1' - x0) + \frac{(v_{2y} - v_{0y})}{y2 - y0}(y1' - y0) + v_{0y} \end{cases}$$

$$\begin{cases} v'_{2x} = \frac{(v_{1x} - v_{0x})}{x1 - x0}(x2' - x0) + \frac{(v_{2x} - v_{0x})}{y2 - y0}(y2' - y0) + v_{0x} \\ v'_{2y} = \frac{(v_{1y} - v_{0y})}{x1 - x0}(x2' - x0) + \frac{(v_{2y} - v_{0y})}{y2 - y0}(y2' - y0) + v_{0y} \end{cases}$$

wherein $\vec{v}_0 = (v_{0x}, v_{0y})$, $\vec{v}_1 = (v_{1x}, v_{1y})$, $\vec{v}_2 = (v_{2x}, v_{2y})$ are the control-point motion vectors for a neighboring block, wherein (x0, y0), (x1, y1) and (x2, y2) are subblock motion vectors of the neighboring block, wherein the control-point motion vectors are described by the three motion vectors $\vec{v}_0' = (v_{0x}', v_{0y}')$, $\vec{v}_1' = (v_{1x}', v_{1y}')$, and $\vec{v}_2' = (v_{2x}', v_{2y}')$, wherein the coordinates of the control-point motion vectors ($\vec{v}_0'$, $\vec{v}_1'$, and $\vec{v}_2'$) are (x0', y0'), (x1', y1') and (x2', y2').

Example 11

The method of any combination of examples 1-3, comprising:
deriving the subblock motion vectors by calculating:

$$\begin{cases} v_x = \frac{(v_{1x} - v_{0x})}{x1 - x0}(x - x0) + \frac{(v_{2x} - v_{0x})}{y2 - y0}(y - y0) + v_{0x} \\ v_y = \frac{(v_{1y} - v_{0y})}{x1 - x0}(x - x0) + \frac{(v_{2y} - v_{0y})}{y2 - y0}(y - y0) + v_{0y} \end{cases}$$

wherein $(v_x, v_y)$ is a subblock motion vector at coordinate (x,y) for a current block, wherein $\vec{v}_0 = (v_{0x}, v_{0y})$, $\vec{v}_1 = (v_{1x}, v_{1y})$, $\vec{v}_2 = (v_{2x}, v_{2y})$ are subblock motion vectors of the neighboring block, wherein (x0, y0), (x1, y1) and (x2, y2) are coordinates of subblock motion vectors of the neighboring block.

Example 12

The method of any combination of examples 1-11, comprising:
selecting a subblock for affine motion inheritance as a top-left, top-middle, and left-middle of the neighboring block; or selecting a subblock for affine motion inheritance as a bottom-right, bottom-middle, and right-middle of the neighboring block.

Example 13

The method of any of examples 1-12, wherein coding comprises decoding.

Example 14

The method of any of examples 1-13, wherein coding comprises encoding.

Example 15

A device for coding video data, the device comprising one or more means for performing the method of any of examples 1-14.

Example 16

The device of example 15, wherein the one or more means comprise one or more processors implemented in circuitry.

Example 17

The device of any of examples 15 and 16, further comprising a memory to store the video data.

Example 18

The device of any of examples 15-17, further comprising a display configured to display decoded video data.

Example 19

The device of any of examples 15-18, wherein the device comprises one or more of a camera, a computer, a mobile device, a broadcast receiver device, or a set-top box.

Example 20

The device of any of examples 15-19, wherein the device comprises a video decoder.

Example 21

The device of any of examples 15-20, wherein the device comprises a video encoder.

Example 22

A computer-readable storage medium having stored thereon instructions that, when executed, cause one or more processors to perform the method of any of examples 1-14.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing video data, the method comprising:

selecting, by one or more processors implemented in circuitry, two or more subblocks of one or more blocks of video data;

generating, by the one or more processors, an affine motion model for a current block of video data using a subblock motion vector from each of the two or more subblocks as control-point motion vectors for the current block and using an approximation of a division operation, wherein generating the affine motion model comprises multiplying an output of a look-up-table operation with a difference of an x-component of a first control-point motion vector of the control-point motion vectors and the x-component of a second control-point motion vector of the control-point motion vectors to generate the approximation of the division operation;

determining, by the one or more processors, one or more prediction blocks based on the affine motion model; and predicting, by the one or more processors, the current block with the one or more prediction blocks.

2. The method of claim 1, wherein selecting the two or more subblocks comprises selecting three subblocks and wherein generating the affine motion model comprises generating the affine motion model using the three subblock motion vectors as the control-point motion vectors.

3. The method of claim 1, wherein selecting the two or more subblocks comprises selecting two subblocks and wherein generating the affine motion model comprises generating the affine motion model using the two subblock motion vectors as the control-point motion vectors.

4. The method of claim 1, wherein selecting the two or more subblocks comprises:

selecting a first subblock associated with a subblock motion vector with coordinates at (x0, y0) for the current block;

selecting a second subblock associated with a subblock motion vector with coordinates at (x1, y1) for the current block, wherein y0 equals y1; and selecting a third subblock associated with a subblock motion vector with coordinates at (x2, y2) for the current block, wherein x0 equals x2.

5. The method of claim 1, wherein selecting the two or more subblocks comprises:

selecting a first subblock of the current block arranged in an upper-left corner of the current block;

selecting a second subblock of the current block arranged in an upper-right corner of the current block; and selecting a third subblock of the current block arranged in a lower-left corner of the current block.

6. The method of claim 1, wherein generating the affine motion model comprises calculating:

$$\begin{cases} v_x = ((v_{1x} - v_{0x}) * x * LUT[x1 - x0] + (v_{2x} - v_{0x}) * y * LUT[y2 - y0] + \\ \quad (v_{0x} \ll \text{LUT\_PRECISION})) \gg \text{LUT\_PRECISION} \\ v_y = ((v_{1y} - v_{0y}) * x * LUT[x1 - x0] + (v_{2y} - v_{0y}) * y * LUT[y2 - y0] + \\ \quad (v_{0y} + \text{LUT\_PRECISION})) \gg \text{LUT\_PRECISION} \end{cases}$$

wherein $(v_x, v_y)$ is a motion vector at coordinates (x,y), wherein $\vec{v}_0$, $\vec{v}_1$, and $\vec{v}_3$ are the control-point motion vectors, wherein $\vec{v}_0 = (v_{0x}, v_{0y})$, $\vec{v}_1 = (v_{1x}, v_{1y})$, and $\vec{v}_2 = (v_{2x}, v_{2y})$, wherein $v_{0x}$ is the x-component of the first control-point motion vector, wherein $v_{1x}$ is the x-component of the second control-point motion vector, wherein (x0, y0), (x1, y1) and (x2, y2), are coordinates of the control-point motion vectors ($\vec{v}_0$, $\vec{v}_1$, and $\vec{v}_2$) for the current block, respectively, LUT is the look-up-table operation, and LUT_PRECISION is a predefined precision.

7. The method of claim 1, wherein generating the affine motion model comprises calculating:

$$\begin{cases} v_x = ((v_{1x} - v_{0x}) * x * LUT[x1 - x0]) \gg LUT_{PRECISION} + \\ \quad ((v_{2x} - v_{0x}) * y * LUT[y2 - y0]) \gg LUT\_PRECISION + v_{0x} \\ v_y = ((v_{1y} - v_{0y}) * x * LUT[x1 - x0]) \gg LUT_{PRECISION} + \\ \quad ((v_{2y} - v_{0y}) * y * LUT[y2 - y0]) \gg LUT\_PRECISION + v_{0y} \end{cases}$$

wherein ($v_x$, $v_y$) is a motion vector at coordinates (x,y), wherein $\vec{v}_0$, $\vec{v}_1$, and $\vec{v}_3$ are the control-point motion vectors, wherein $\vec{v}_0 = (v_{0x}, v_{0y})$, $\vec{v}_1 = (v_{1x}, v_{1y})$, and $\vec{v}_2 = (v_{2x}, v_{2y})$, wherein $v_{0x}$ is the x-component of the first control-point motion vector, wherein $v_{1x}$ is the x-component of the second control-point motion vector, wherein (x0, y0), (x1, y1) and (x2, y2), are coordinates of the control-point motion vectors ($\vec{v}_0$, $\vec{v}_1$ and $\vec{v}_2$) for the current block, respectively, LUT is the look-up-table operation, and LUT_PRECISION is a predefined precision.

8. The method of claim 1, wherein selecting the two or more subblocks comprises:
selecting a subblock at an extended column and an extended row of the current block.

9. The method of claim 1, wherein predicting the current block generates a predicted block, the method comprising:
decoding, by the one or more processors, a residual block for the current block; and
combining, by the one or more processors, the predicted block and the residual block to decode the current block.

10. The method of claim 1, comprising:
generating, by the one or more processors, a residual block for the current block based on differences between the current block and the one or more prediction block; and
encoding, by the one or more processors, the residual block.

11. A device for processing video data, the device comprising:
a memory configured to store video data; and
one or more processors implemented in circuitry and configured to:
select two or more subblocks of one or more blocks of the video data;
generate an affine motion model for a current block of the video data using a subblock motion vector from each of the two or more subblocks as control-point motion vectors for the current block and using an approximation of a division operation, wherein, to generate the affine motion model, the one or more processors are configured to multiply an output of a look-up-table operation with a difference of an x-component of a first control-point motion vector of the control-point motion vectors and the x-component of a second control-point motion vector of the control-point motion vectors to generate the approximation of the division operation;
determine one or more prediction blocks based on the affine motion model; and
predict the current block with the one or more prediction blocks.

12. The device of claim 11, wherein, to select the two or more subblocks, the one or more processors are configured to:
select a first subblock associated with a subblock motion vector with coordinates at (x0, y0) for the current block;
select a second subblock associated with a subblock motion vector with coordinates at (x1, y1) for the current block, wherein y0 equals y1; and
select a third subblock associated with a subblock motion vector with coordinates at (x2, y2) for the current block, wherein x0 equals x2.

13. The device of claim 11, wherein, to select the two or more subblocks, the one or more processors are configured to:
select a subblock at an extended column and an extended row of the current block.

14. The device of claim 11, wherein predicting the current block generates a predicted block and wherein the one or more processors are configured to:
decode a residual block for the current block; and
combine the predicted block and the residual block to decode the current block.

15. The device of claim 11, wherein the one or more processors are configured to:
generate a residual block for the current block based on differences between the current block and the one or more prediction block; and
encode the residual block.

16. The device of claim 11, wherein the device comprises one or more of a camera, a computer, a mobile device, a broadcast receiver device, or a set-top box.

17. A non-transitory computer-readable storage medium having stored thereon instructions that, when executed, cause a processor to:
select two or more subblocks of one or more blocks of video data;
generate an affine motion model for a current block of video data using a subblock motion vector from each of the two or more subblocks as control-point motion vectors for the current block and using an approximation of a division operation, wherein the instructions that cause the processor to generate the affine motion model further cause the processor to multiply an output of a look-up-table operation with a difference of an x-component of a first control-point motion vector of the control-point motion vectors and the x-component of a second control-point motion vector of the control-point motion vectors to generate the approximation of the division operation;
determine one or more prediction blocks based on the affine motion model; and
predict the current block with the one or more prediction blocks.

18. A device for coding video data, the device comprising:
means for selecting two or more subblocks of one or more blocks of video data;
means for generating an affine motion model for a current block of video data using a subblock motion vector from each of the two or more subblocks as control-point motion vectors for the current block and using an approximation of a division operation, wherein the means for generating the affine motion model comprises means for multiplying an output of a look-up-table operation with a difference of an x-component of a first control-point motion vector of the control-point motion vectors and the x-component of a second control-point motion vector of the control-point motion vectors to generate the approximation of the division operation;

means for determining one or more prediction blocks based on the affine motion model; and means for predicting the current block with the one or more prediction blocks.

* * * * *